US012673405B2

(12) United States Patent
Petrus

(10) Patent No.: US 12,673,405 B2
(45) Date of Patent: Jul. 7, 2026

(54) POWER TOOL VIBRATION ISOLATION FEATURES, RELATED SYSTEMS AND METHODS

(71) Applicant: Black & Decker Inc., New Britain, CT (US)

(72) Inventor: Tyler Petrus, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/967,750

(22) Filed: Dec. 4, 2024

(65) Prior Publication Data

US 2026/0151889 A1 Jun. 4, 2026

(51) Int. Cl.
| *B25F 5/00* | (2006.01) |
| *H01M 50/227* | (2021.01) |
| *H01M 50/242* | (2021.01) |
| *H01M 50/247* | (2021.01) |

(52) U.S. Cl.
CPC ........... *B25F 5/006* (2013.01); *H01M 50/227* (2021.01); *H01M 50/242* (2021.01); *H01M 50/247* (2021.01); *H01M 2220/30* (2013.01)

(58) Field of Classification Search
CPC ............. H01M 50/227; H01M 50/242; H01M 50/247; H01M 2220/30
See application file for complete search history.

(56) References Cited

U.S. PATENT DOCUMENTS

| | | | |
|---|---|---|---|
| 7,766,097 B2 | 8/2010 | Kondo | |
| 8,062,060 B2 | 11/2011 | Rejman | |
| 10,232,479 B2 | 3/2019 | Thorson et al. | |
| 10,263,228 B2 | 4/2019 | Nishikawa et al. | |
| 11,679,482 B2 * | 6/2023 | Furusawa | B25D 17/24 |
| | | | 173/117 |
| 11,890,740 B2 | 2/2024 | Petrus | |
| 2014/0326477 A1 * | 11/2014 | Thorson | B25F 5/006 |
| | | | 173/171 |
| 2019/0193223 A1 * | 6/2019 | Thorson | B25F 5/006 |
| 2021/0237249 A1 * | 8/2021 | Fischer | B25F 5/02 |
| 2021/0379717 A1 * | 12/2021 | Thorson | B25F 5/006 |
| 2023/0150106 A1 * | 5/2023 | Radovich | H01M 50/267 |
| | | | 173/217 |
| 2023/0158621 A1 * | 5/2023 | Thorson | B25F 5/006 |
| | | | 173/171 |
| 2024/0058912 A1 * | 2/2024 | Thorson | B25F 5/006 |

FOREIGN PATENT DOCUMENTS

WO WO-2022261302 A1 * 12/2022 ............. H02K 7/145

* cited by examiner

*Primary Examiner* — Eyamindae C Jallow

(74) *Attorney, Agent, or Firm* — Womble Bond Dickinson (US) LLP

(57) ABSTRACT

A power tool includes a power tool housing and a battery pack interface at least partially received in the power tool housing, the battery pack interface having a body at least partially defining a battery pack receiving portion for receiving a battery pack and at least one vibration isolation portion extending towards the power tool housing, the at least one vibration isolation portion for at least partially isolating a battery pack from one or more forces generated by the power tool.

20 Claims, 30 Drawing Sheets

10

12

14

16

10

12

16

14

100

102

106

108

114

112

110

116

112a

112b

POWER TOOL VIBRATION ISOLATION FEATURES, RELATED SYSTEMS AND METHODS

TECHNICAL FIELD

The present application relates to a power tool configured for use with a detachable battery pack, and isolation features for isolating the battery pack from vibrations associated with operation of the the power tool. In some implementations, the power tool includes a battery pack interface having at least one vibration isolation portion positioned between the battery pack and a housing of the power tool.

BACKGROUND

Power tools include an electric motor that can be energized by a power source, such as a removable battery pack. Such power tools can thus be provided with a tool application element such as a saw blade, wrench, driver, etc., that can be driven by one or motors of the power tool as energized by the battery pack.

In general, vibrations associated with operation of such power tools, which can result from movement of the motor (s), from the tool application element, and/or from manipulation by a user, can negatively affect an interface between the power tool and the battery pack, which can include the disruption and/or inhibition of electrical contact between the battery and the power tool, material fatigue, material failure, etc. Such negative effects of vibrations on interfaces between the battery pack and the power tool can lead to operational downtimes, replacement/repair costs, premature retirement of otherwise serviceable units, etc.

Accordingly, there is a need for improved interfaces between a battery pack and a power tool that attenuate the negative impacts of vibrations associated with the operation of such power tools.

SUMMARY

An aspect of the present disclosure is directed to a power tool including a power tool housing having a battery pack receptacle and a battery pack interface at least partially received in the battery pack receptacle, the battery pack interface having a body at least partially defining vibration isolation features for at least partially isolating a battery pack from one or more forces generated by the power tool.

Another aspect of the present disclosure is directed to a battery pack interface including a body coupled with a set of terminals. The battery pack interface body includes a set of rails and channels for mechanically cooperating with a corresponding set of rails and channels of a removable battery pack. The body of the battery pack interface can be provided with at least one vibration isolation portion for at least partially isolating the battery pack from vibrations transmitted from the power tool housing, and can be integrally formed as a single molded piece with vibration isolation features to dampen the transmission of vibrations from the power tool to the battery pack.

Another aspect of the disclosure is generally directed to a power tool, the power tool comprising a power tool housing and a battery pack interface at least partially received in the power tool housing, the battery pack interface comprising a body at least partially defining a battery pack receiving portion for receiving a battery pack and at least one vibration isolation portion extending towards the power tool housing, the at least one vibration isolation portion for at least partially isolating a battery pack from one or more forces generated by the power tool.

Another aspect of the present disclosure is generally directed to a method of assembling a power tool, the method comprising obtaining a battery pack interface comprising a body at least partially defining a battery pack receiving portion and at least one vibration isolation portion extending from the battery pack receiving portion, and attaching the battery pack interface to a power tool housing such that the at least one vibration portion is arranged for at least partially isolating a battery pack from one or more forces generated by the power tool.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

Referring to FIGS. 1-4, an example embodiment of a power tool 10 is illustrated. The power tool 10 can be part of a set of power tools that can have features common with the power tool 10, for example, a battery pack interface thereof, such that components and features of the power tool 10 or those configured for use therewith may be interchangeably used with other power tools in the set. While the illustrated power tool 10 is in the configuration of an impact tool, e.g., a tool configured to convert continuous motor torque to periodic rotational impacts, it will be understood that the set of power tools may include, but is not limited to other power tools such as reciprocating saws, circular saws, hammer drills, fastener drivers, etc.

Figure 17:
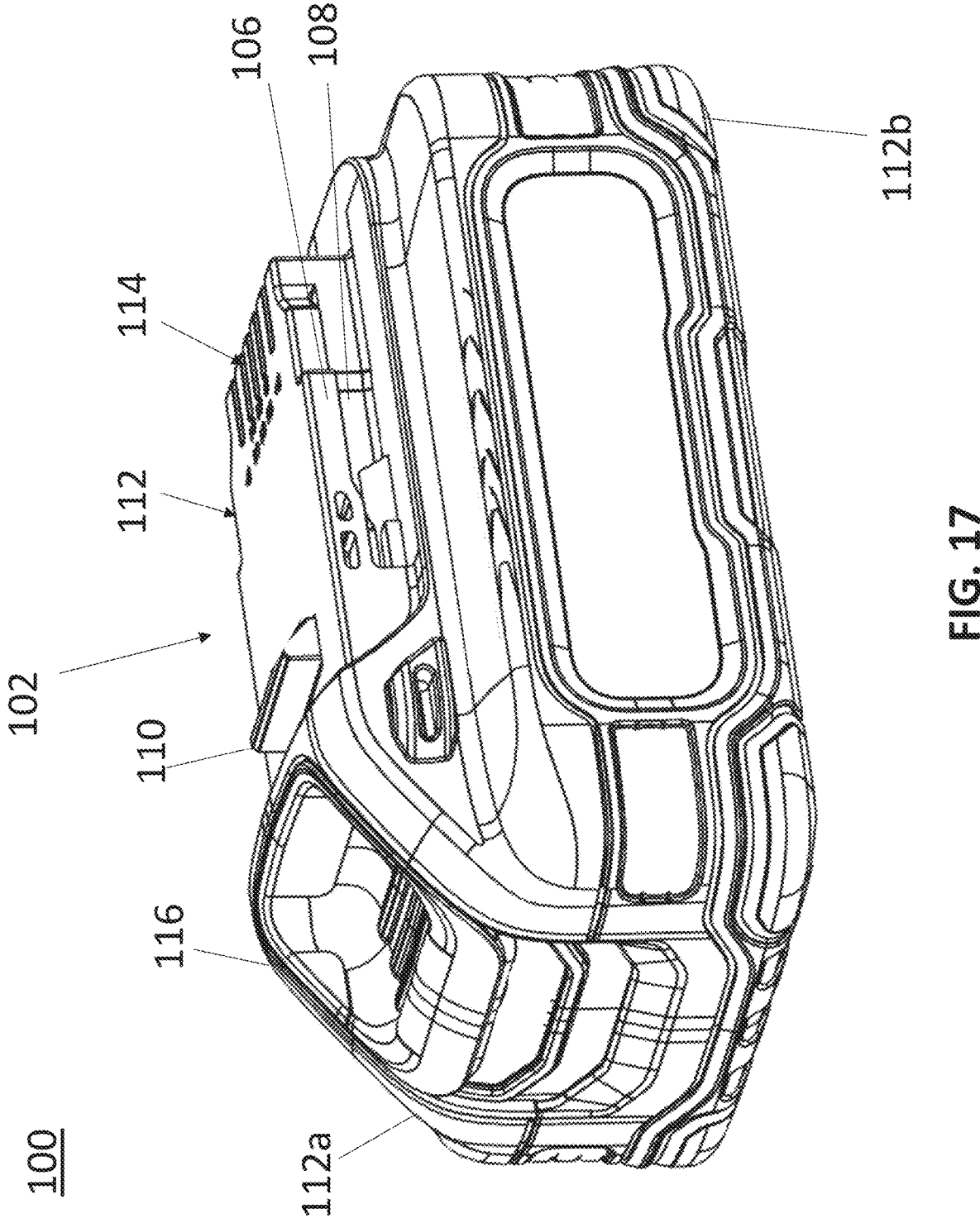
FIG. 17 is an isometric view of an example battery pack suitable for use with the power tool of FIG. 1 according to an example embodiment of the disclosure.
Figure 18:
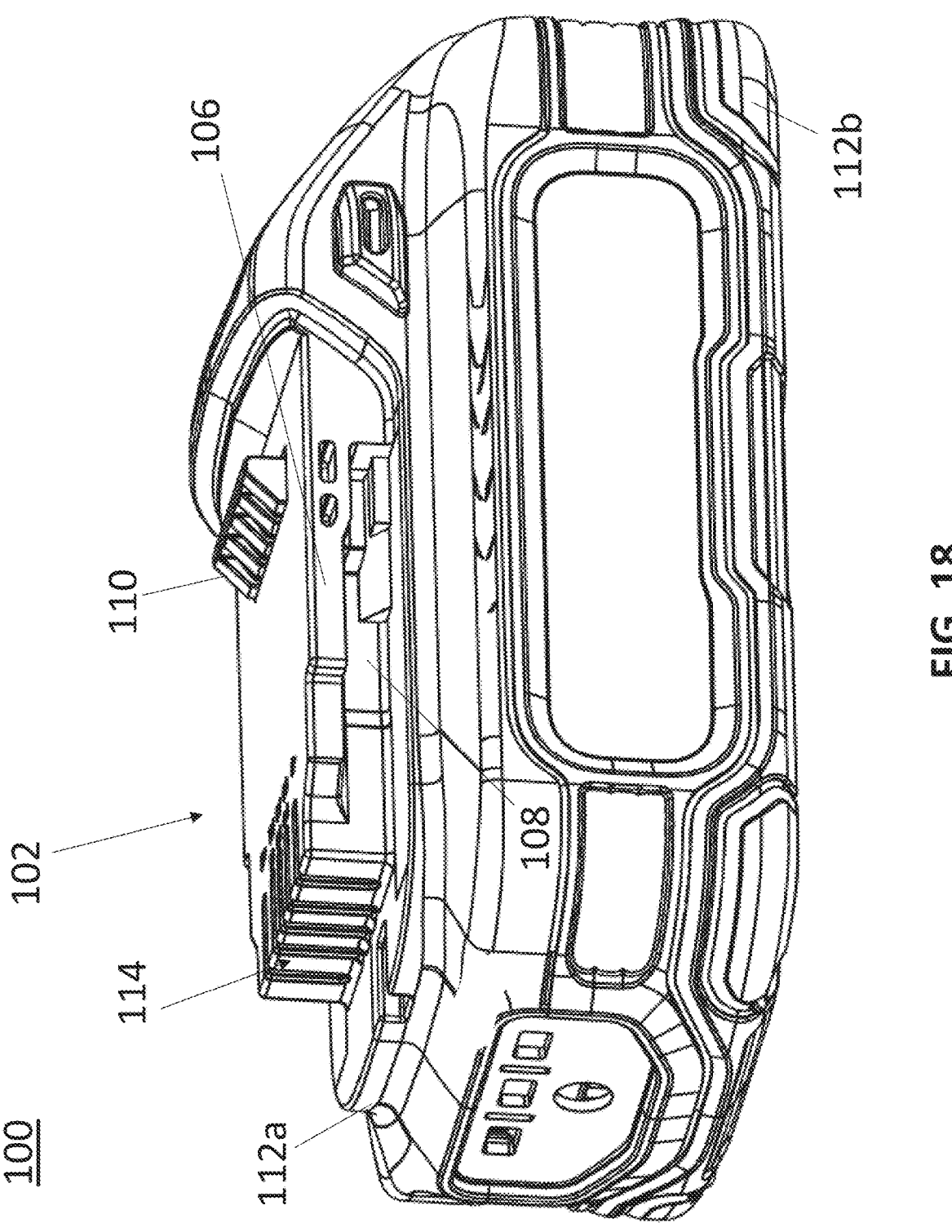
FIG. 18 is another isometric view of the battery pack of FIG. 17.
Figure 19:
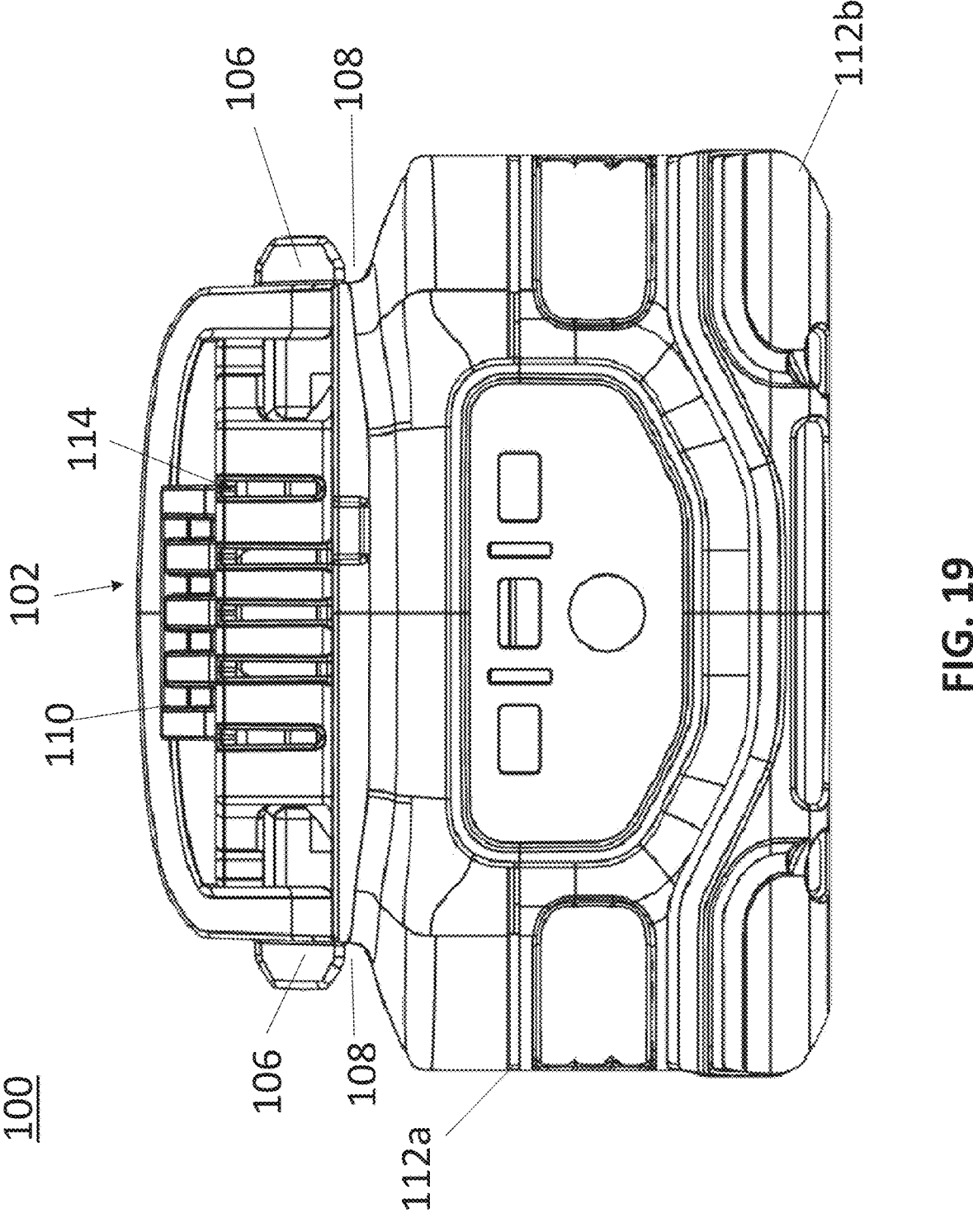
FIG. 19 is a rear elevation view of the battery pack of FIG. 17.

The example power tool 10 is powered by a removable (detachable), rechargeable (secondary) battery pack 100, illustrated in FIGS. 17-19. Other, similar, battery packs may be used with the example set of power tools.

Figure 1:
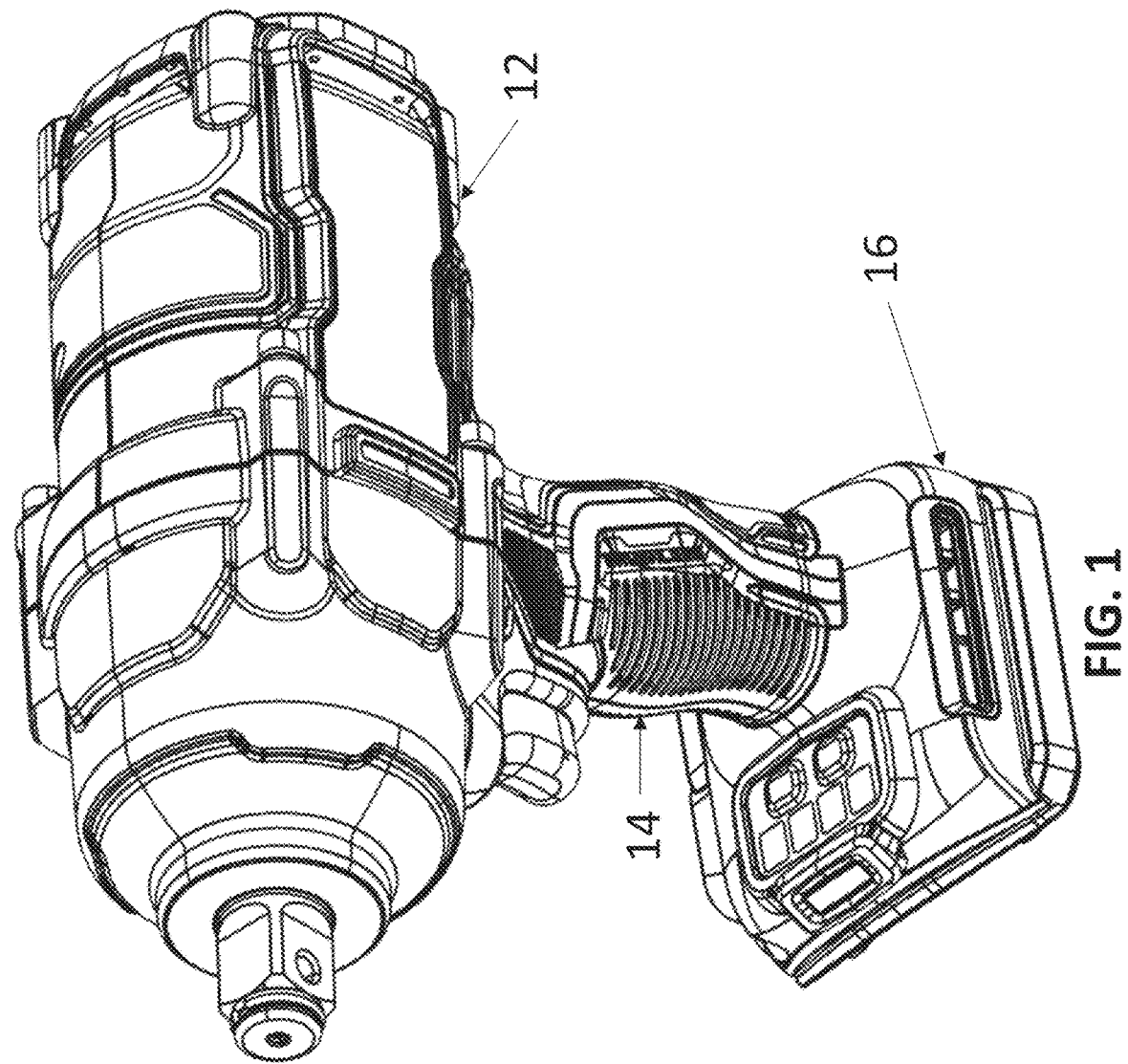
FIG. 1 is a first, left side isometric view of a power tool according to an example embodiment of the disclosure.
Figure 2:
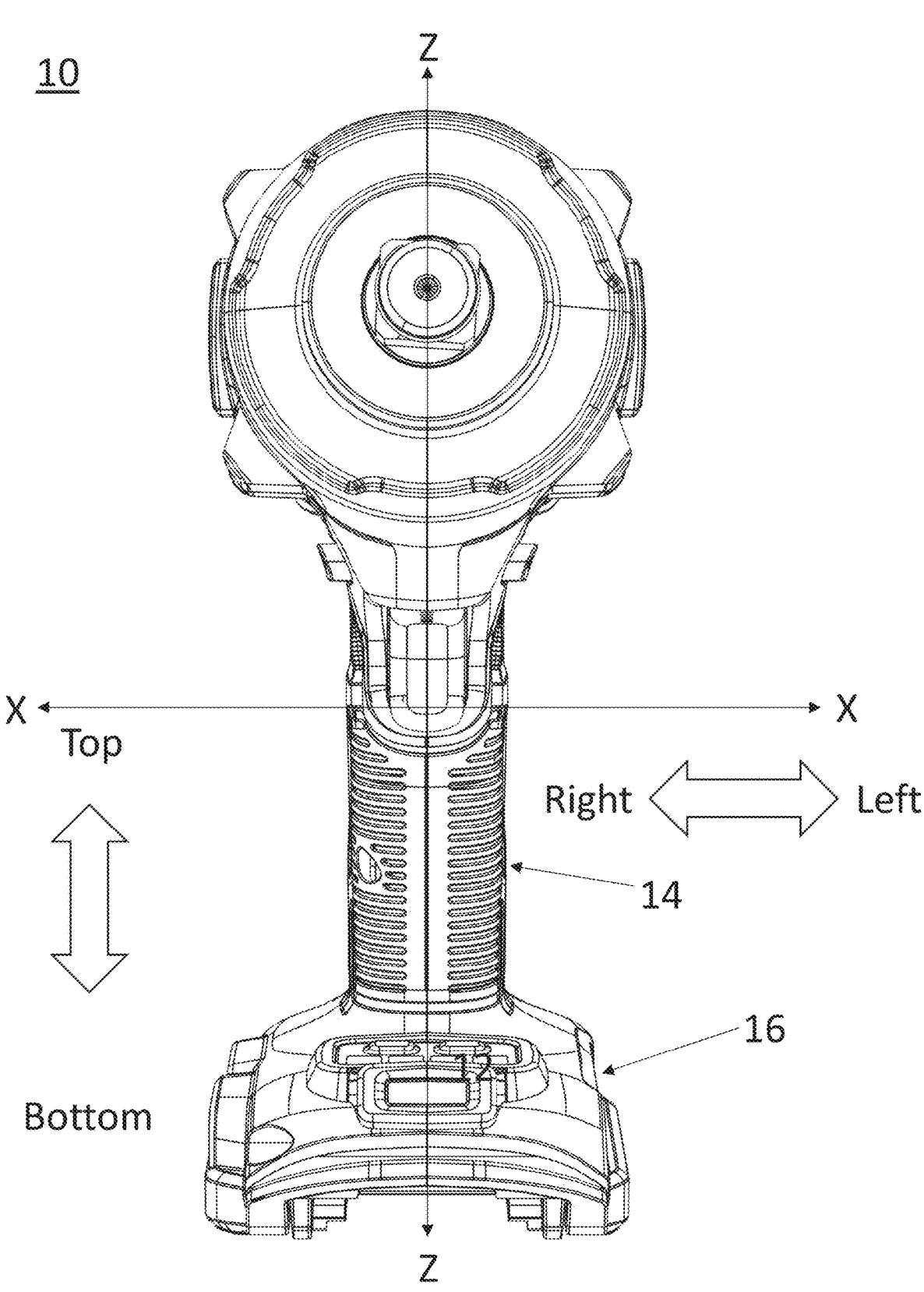
FIG. 2 is a front elevation view of the power tool of FIG. 1.
Figure 3:
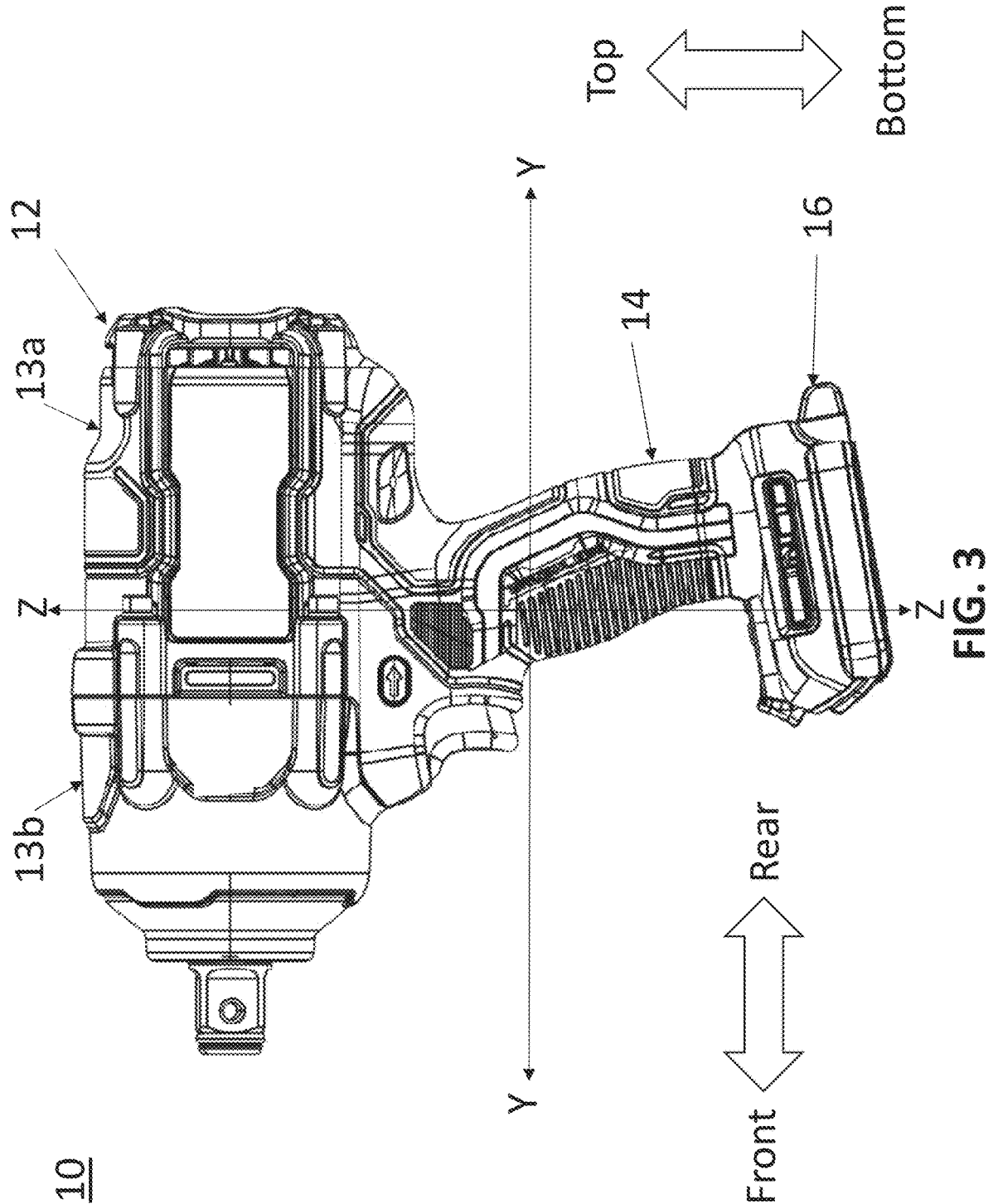
FIG. 3 is a side elevation view of the power tool of FIG. 1.
Figure 4:
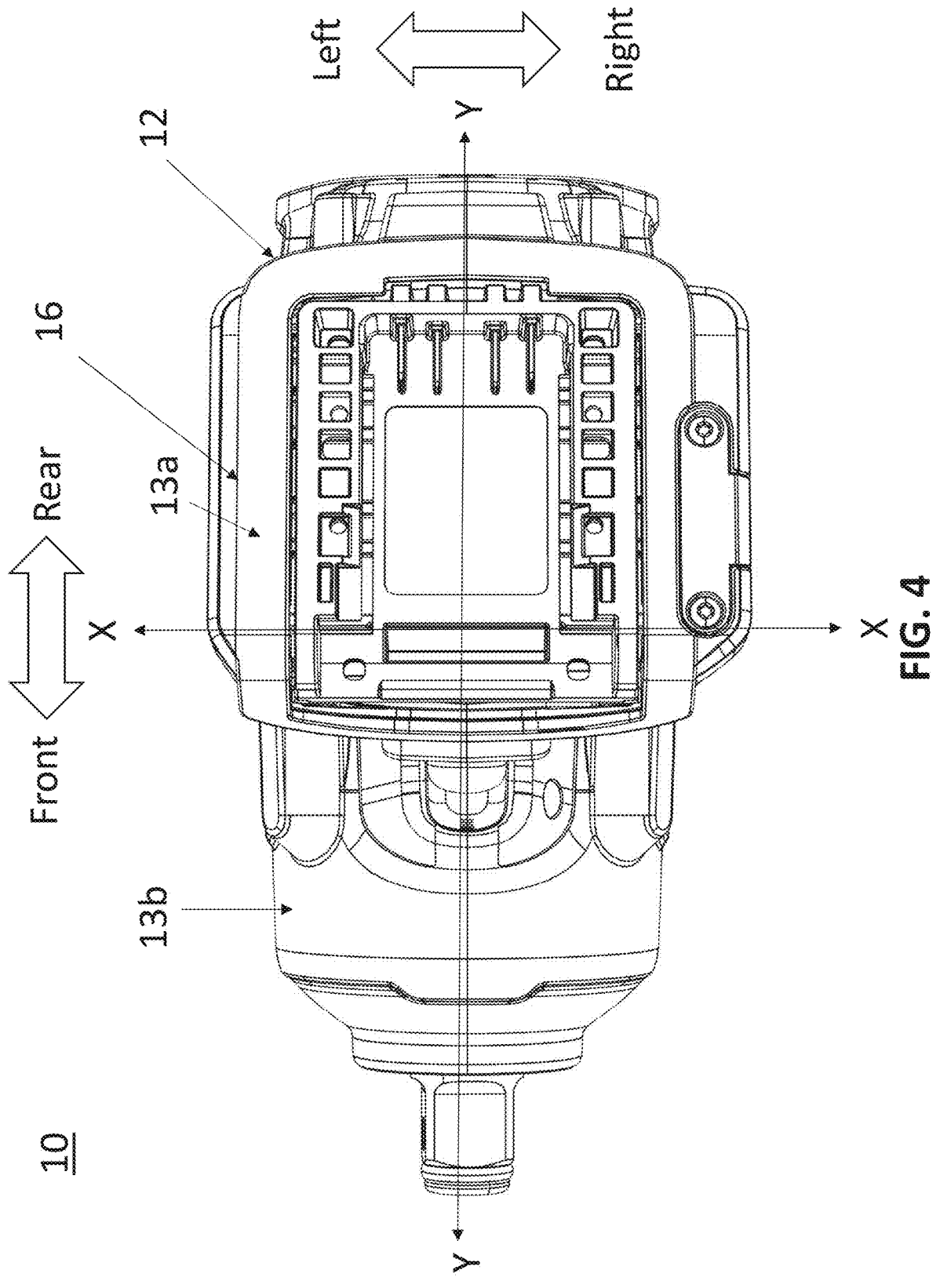
FIG. 4 is a bottom plan view of the power tool of FIG. 1.

As described herein, the power tool 10 may be oriented about three axes: an X-axis, a Y-axis, and a Z-axis. Referring to FIGS. 2 and 4, the X-axis defines the power tool 10 generally in the left and right directions. Referring to FIGS. 3 and 4, the Y-axis defines the power tool 10 generally in the front/forward and rear/backward directions. Referring to FIGS. 2 and 3, the Z-axis defines the power tool 10 generally in the up/top and down/bottom directions.

In the aforementioned arrangement, the X-axis is perpendicular to each of the Y-axis and the Z-axis, the Y-axis is perpendicular to each of the X-axis and the Z-axis, and the Z-axis is perpendicular to each of the X-axis and the Y-axis. A first (XY) plane may be defined by the X-axis and the Y-axis. A second (YZ) plane may be defined by the Y-axis and the Z-axis. A third (XZ) plane may be defined by the X-axis and the Z-axis. It will be understood that the power tool 10 can be differently oriented with respect to a set of coordinate axes.

The power tool 10 may include a housing 12 that at least partially surrounds an interior 11 (FIG. 7) within which one or more interior components of the power tool 10 can be held, as described further herein.

Figure 7:
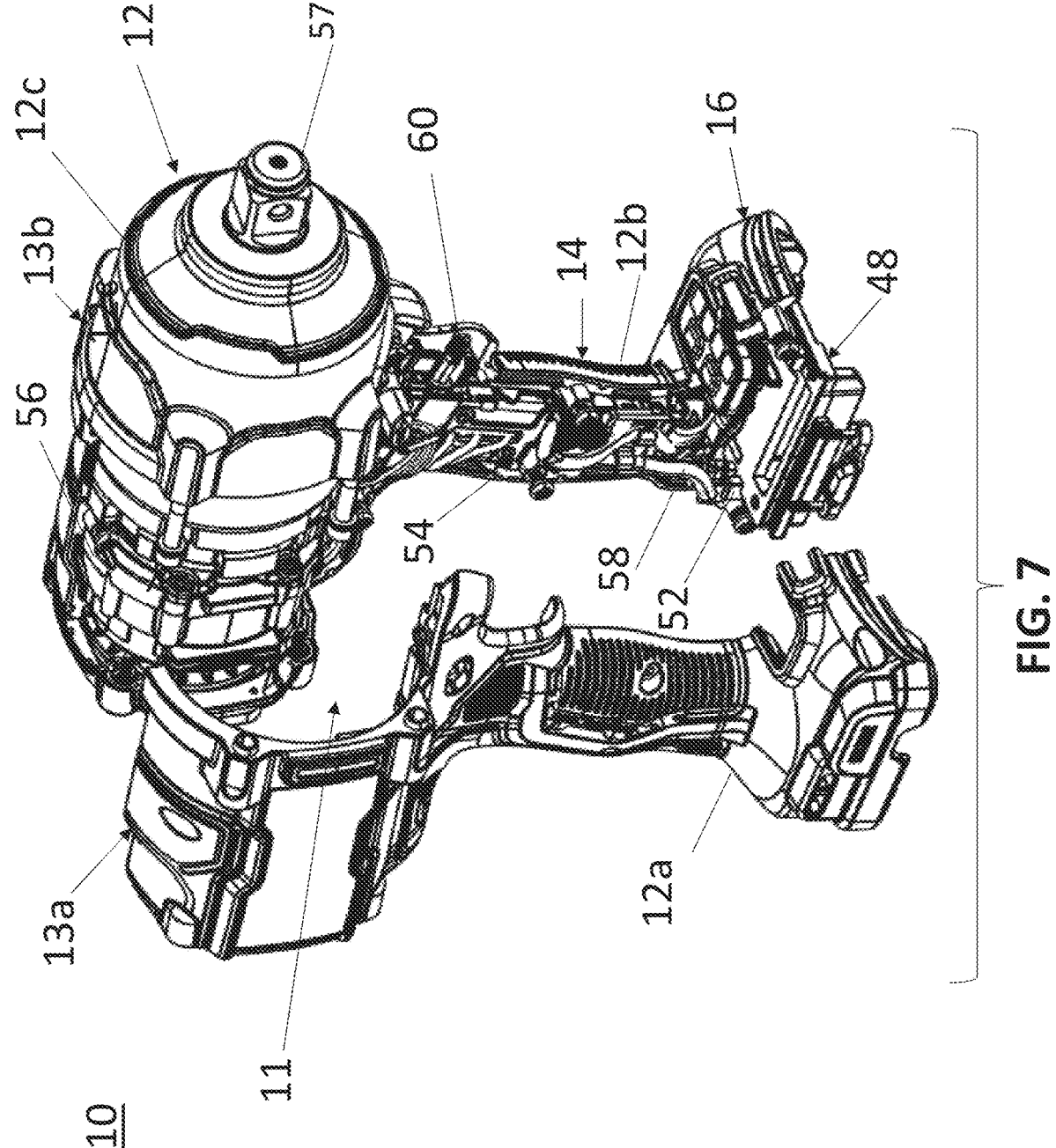
FIG. 7 is a partially exploded isometric view of the power tool of FIG. 1.
Figure 8:
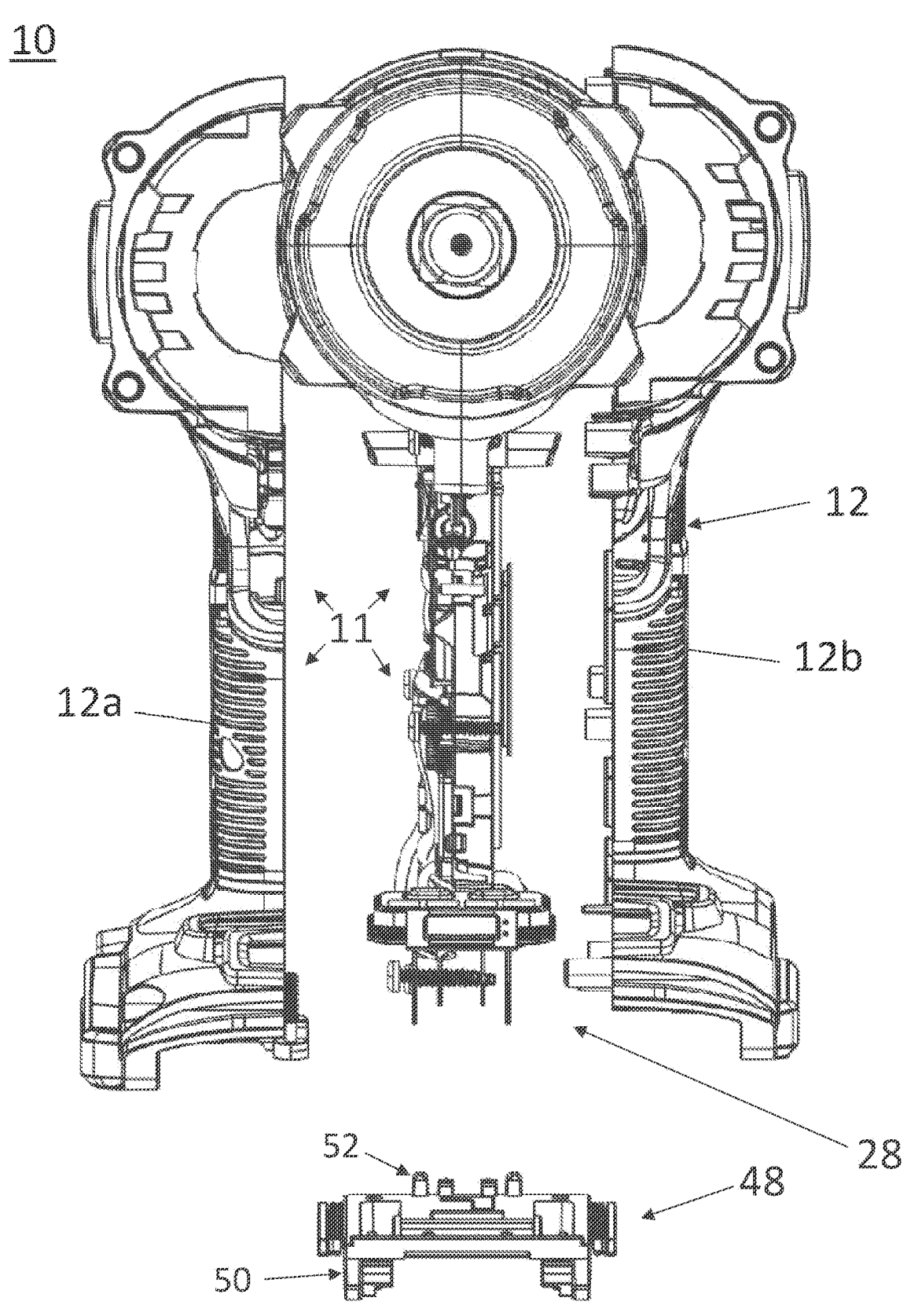
FIG. 8 is an exploded front elevation view of the power tool of FIG. 2.

With reference to FIGS. 7 and 8, the housing 12 can include a right housing portion 12a and a left housing portion 12b that can mate generally along the YZ-plane. The housing 12 can also include a motor cover portion 12c that may at least partially face the XZ-plane. In this regard, the housing 12 can have clamshell arrangement in which at least the housing portions 12a, 12b are coupled to one another along a seam, though it will be understood that the housing 12 could be at least partially monolithically formed without departing from the disclosure.

Referring to FIGS. 3-4 and 7, the housing 12 can have an arrangement so as to at least partially define a motor housing portion 13a, a transmission housing portion 13b, a generally elongate handle 14 extending downward from the motor housing 13a, and a tool foot 16 along a lower portion of the power tool below the handle 14.

Figure 5:
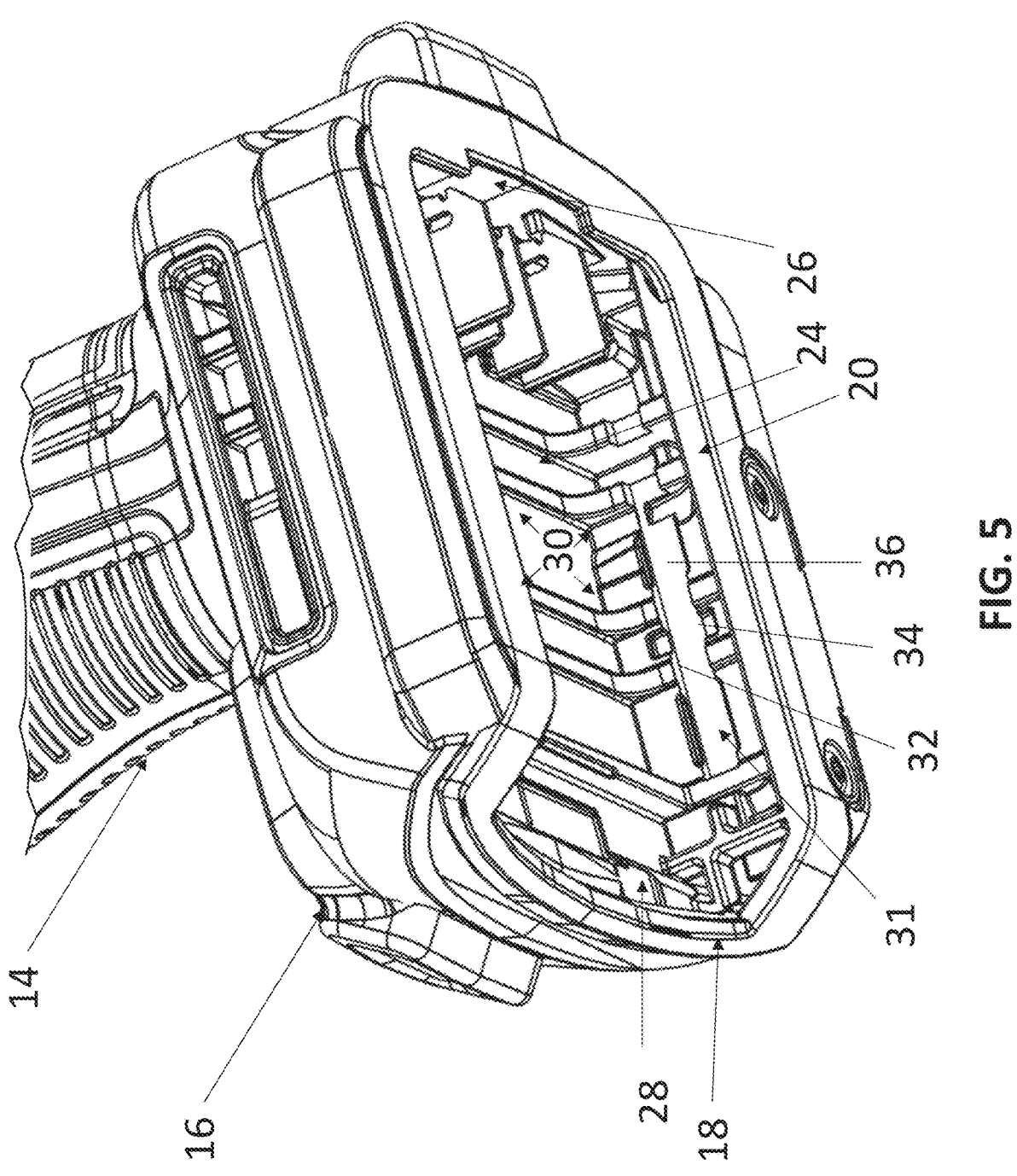
FIG. 5 is an enlarged isometric view of a foot of the power tool of FIG. 1 sans a battery pack interface.
Figure 6:
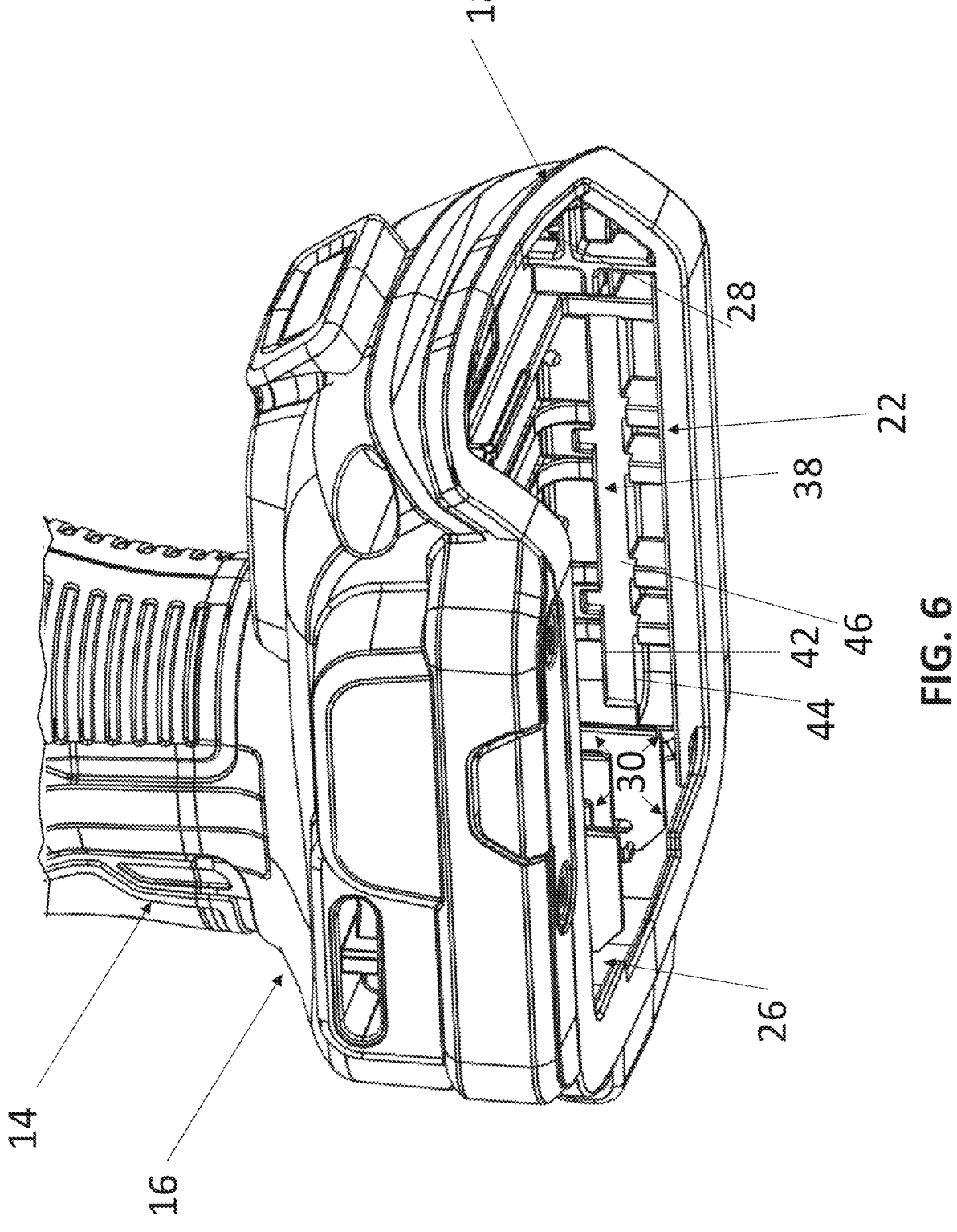
FIG. 6 is another enlarged isometric view of the foot of the power tool of FIG. 1 sans the battery pack interface.
Figure 9:
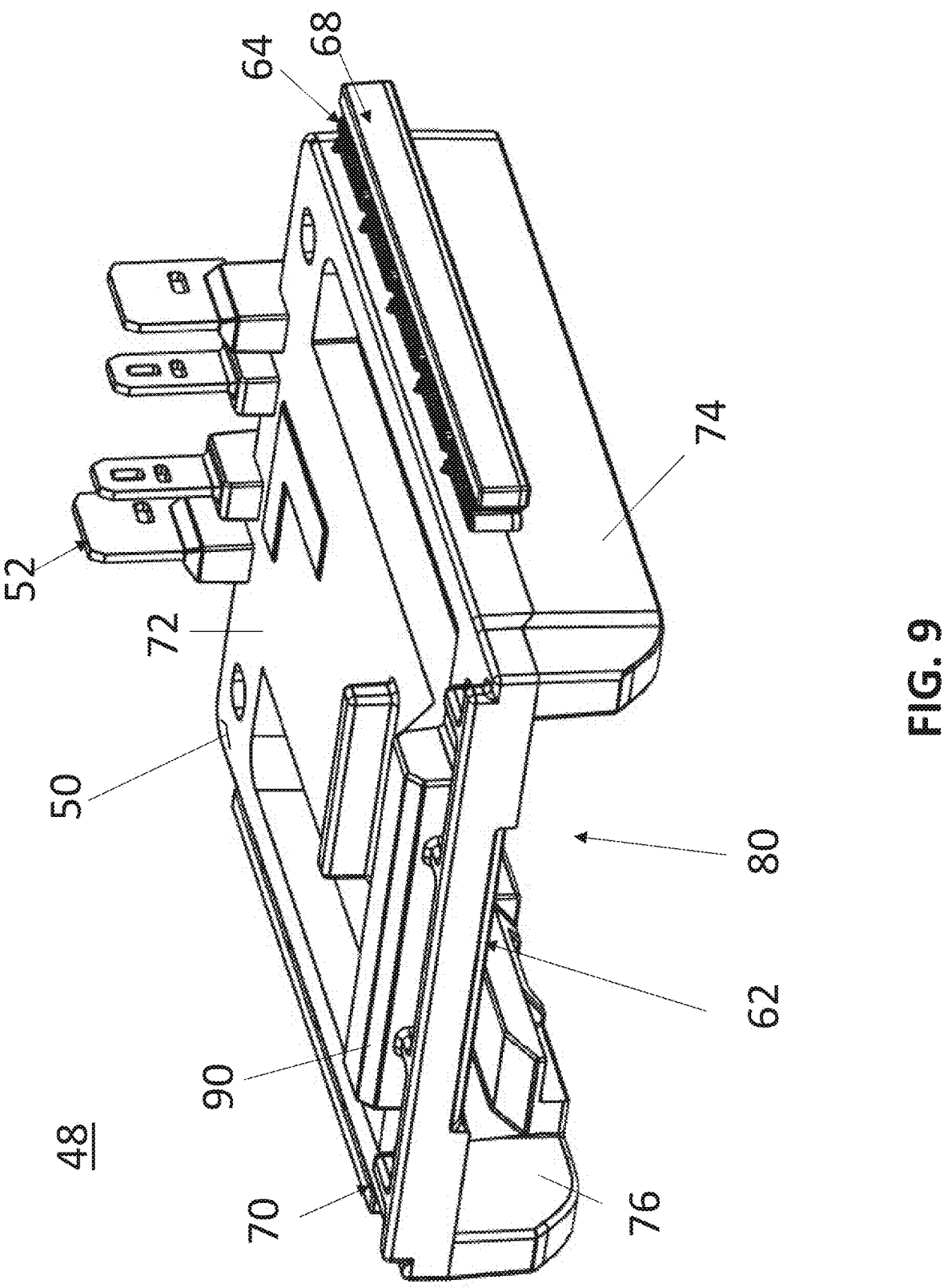
FIG. 9 is an isometric view of an example battery pack interface of the power tool of FIG. 1 shown in isolation for clarity of illustration.
Figure 10:
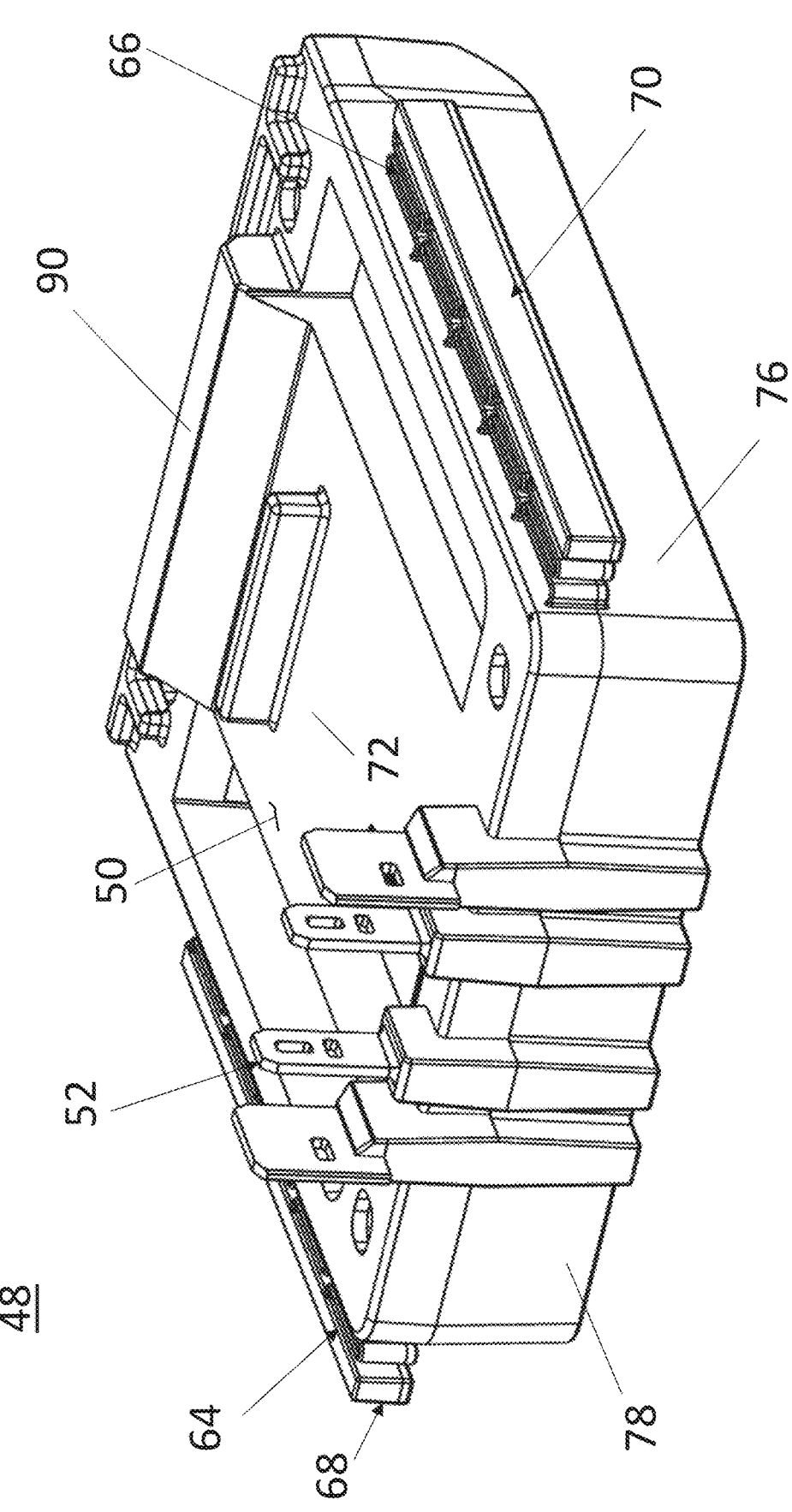
FIG. 10 is another isometric view of the battery pack interface of FIG. 9.
Figure 11:
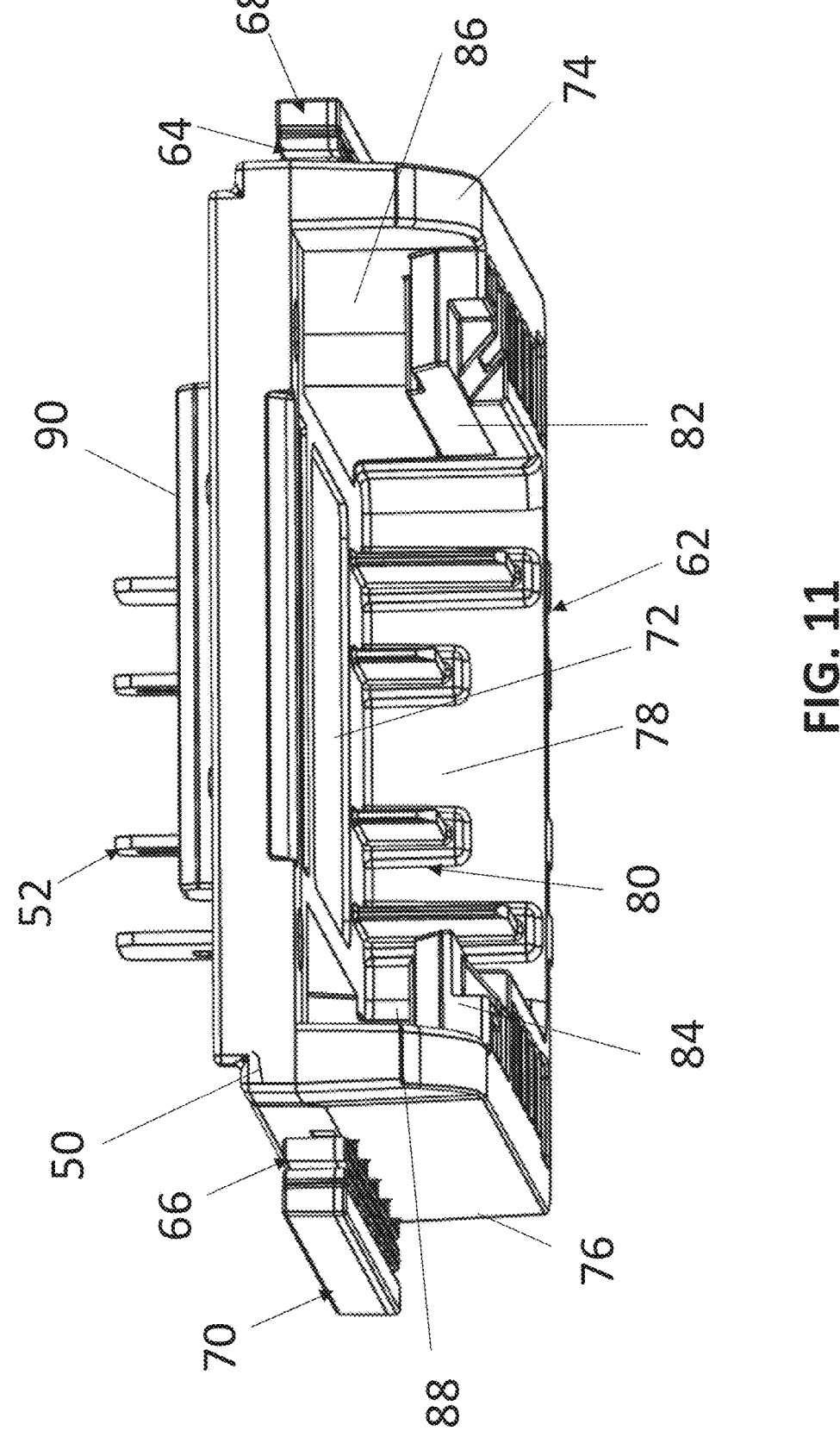
FIG. 11 is another isometric view of the battery pack interface of FIG. 9.
Figure 12:
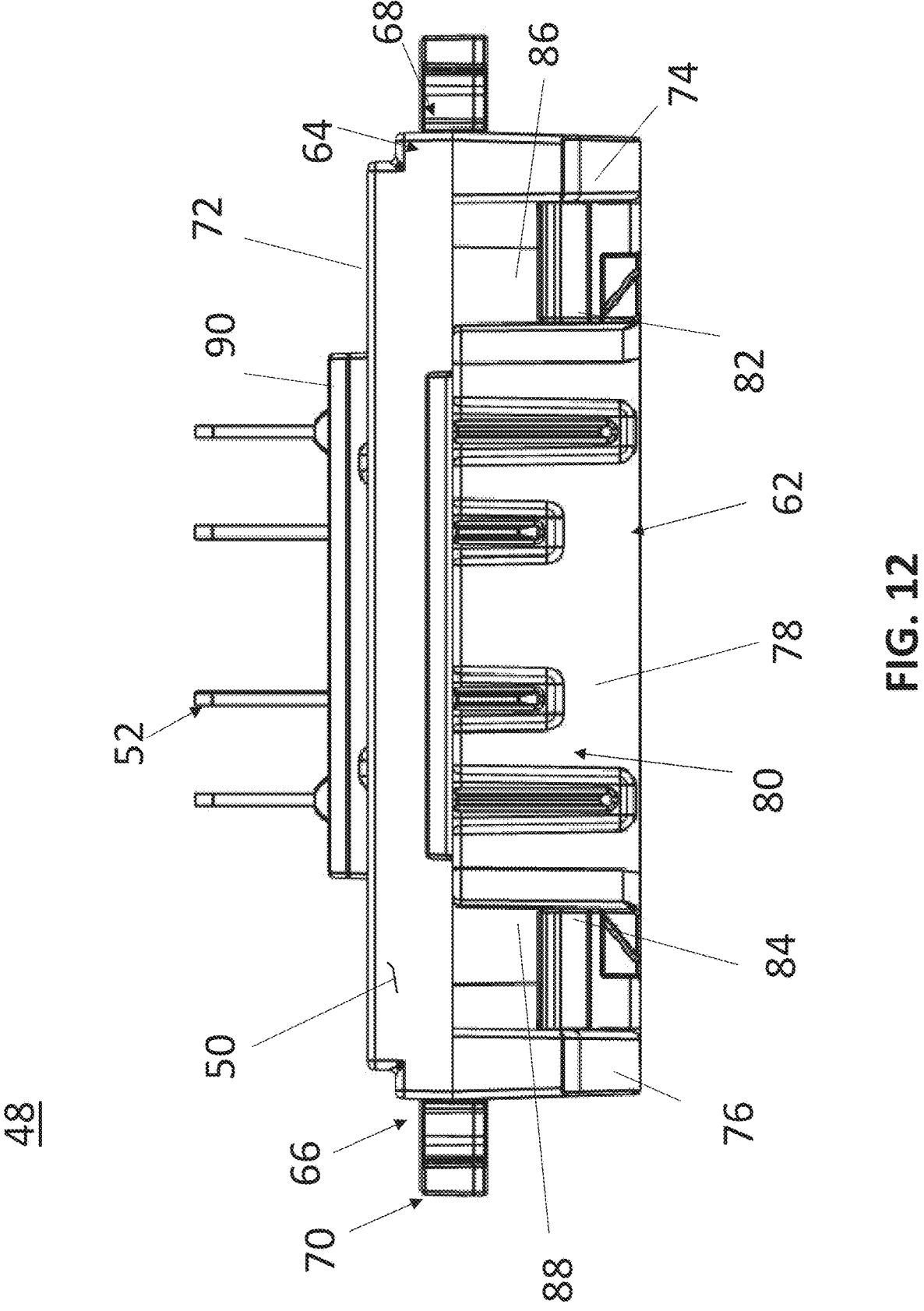
FIG. 12 is a front elevation view of the battery pack interface of FIG. 9.

Referring to FIGS. 5 and 6, the power tool housing 12, for example, the tool foot 16, may at least partially define a receptacle 18 for a battery pack interface 48 (FIG. 9). In this regard, the receptacle 18 can be at least partially defined by the arrangement of the right housing portion 12a and the left housing portion 12b. It will be understood that that the receptacle 18 can be at least partially defined by a different housing arrangement. Furthermore, it will be understood that other power tools in a set of power tools can include a receptacle located in a different relative location. For example, a power tool in the configuration of a saw, having a housing configuration different than that of a drill, could have a receptacle closer to the handle.

The receptacle 18 can include a first side wall or portion 20 (broadly, "first side wall or portion"), a second side wall or portion 22 (broadly, "second side wall or portion"), an interior top/base wall or portion 24, a rear wall or portion 26, and a front wall or portion 28. As shown, the walls/portions 20, 22, 24, 26, 28 of the receptacle 18 can be arranged so as to extend at least partially around an interior volume 30 of the receptacle 18 for at least partially receiving a battery pack interface 48. The portion of the power tool housing 12 that forms the receptacle 18 is sometimes referred to as a shroud.

As shown, the first side wall 20 of the receptacle 18 can be at least partially recessed toward the exterior of the housing 12 so as to at least partially define a channel 31 there along for at least partially receiving a portion of the battery pack interface 48, as described in more detail below. In the illustrated embodiment, the channel 31 can be at least partially formed between an upper recess surface 32, a lower recess surface 34, and a side recess surface 36. The channel 31 can additionally be formed between forward and rear surfaces at least partially defined along the side wall 20. In some embodiments, one or more of the upper recess surface 32, the lower recess surface 34, and the side recess surface 36 can have one or more discontinuities therealong.

Similarly, the second side wall 22 of the receptacle 18 can be at least partially recessed toward the exterior of the housing 12 so as to at least partially define a channel 38 there along for at least partially receiving a portion of the battery pack interface 48, as described in more detail below. The channel 38 can be at least partially formed between an upper recess surface 42, a lower recess surface 44, and a side recess surface 46, one or more of which can have one or more discontinuities there along. The channel 38 can additionally be formed between forward and rear surfaces at least partially defined along the side wall 22.

Figure 20:
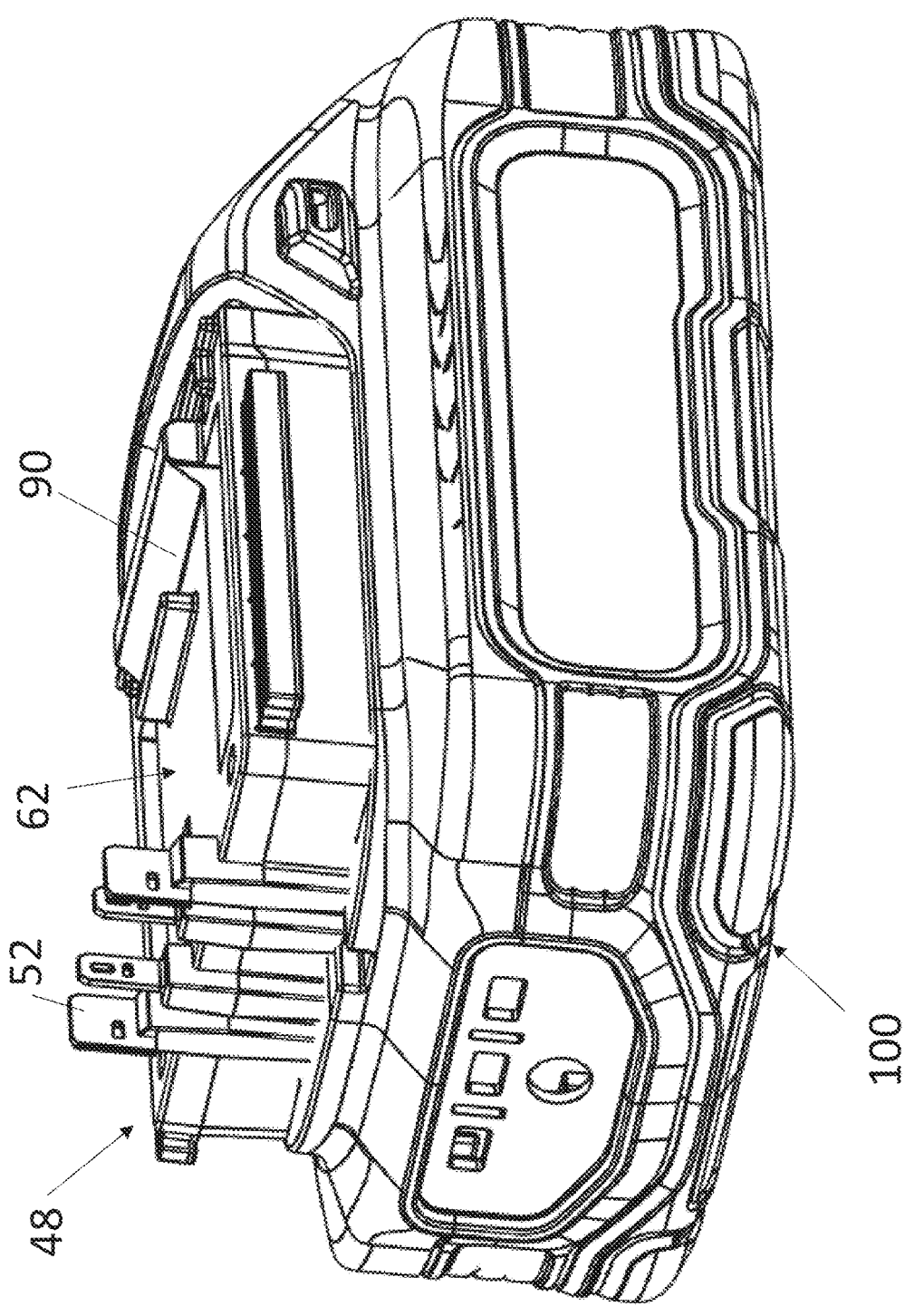
FIG. 20 is an isometric view of the battery pack interface of FIG. 9 coupled to the battery pack of FIG. 17.
Figure 21:
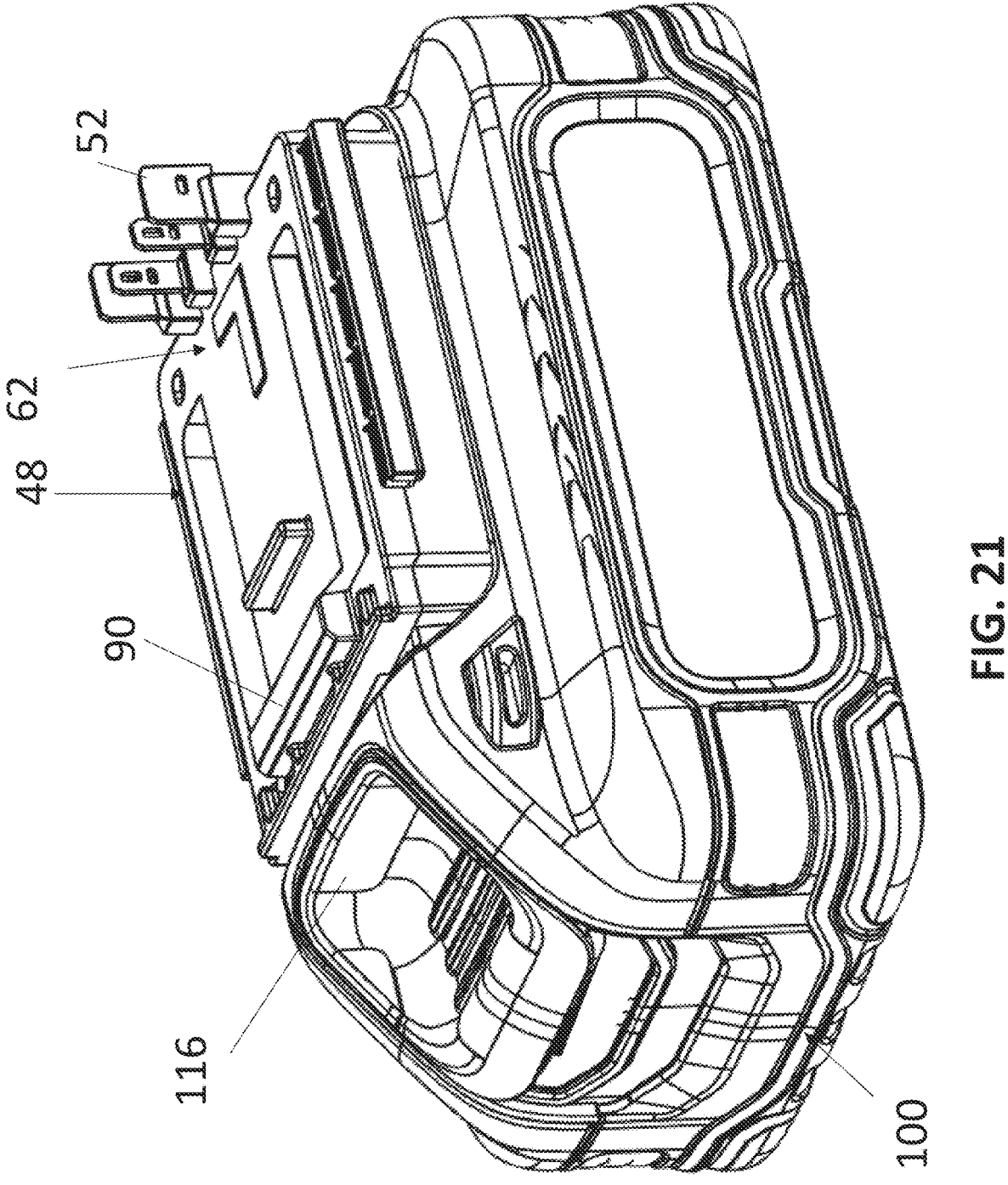
FIG. 21 is another isometric view of the battery pack interface and the battery pack of FIG. 20.
Figure 22:
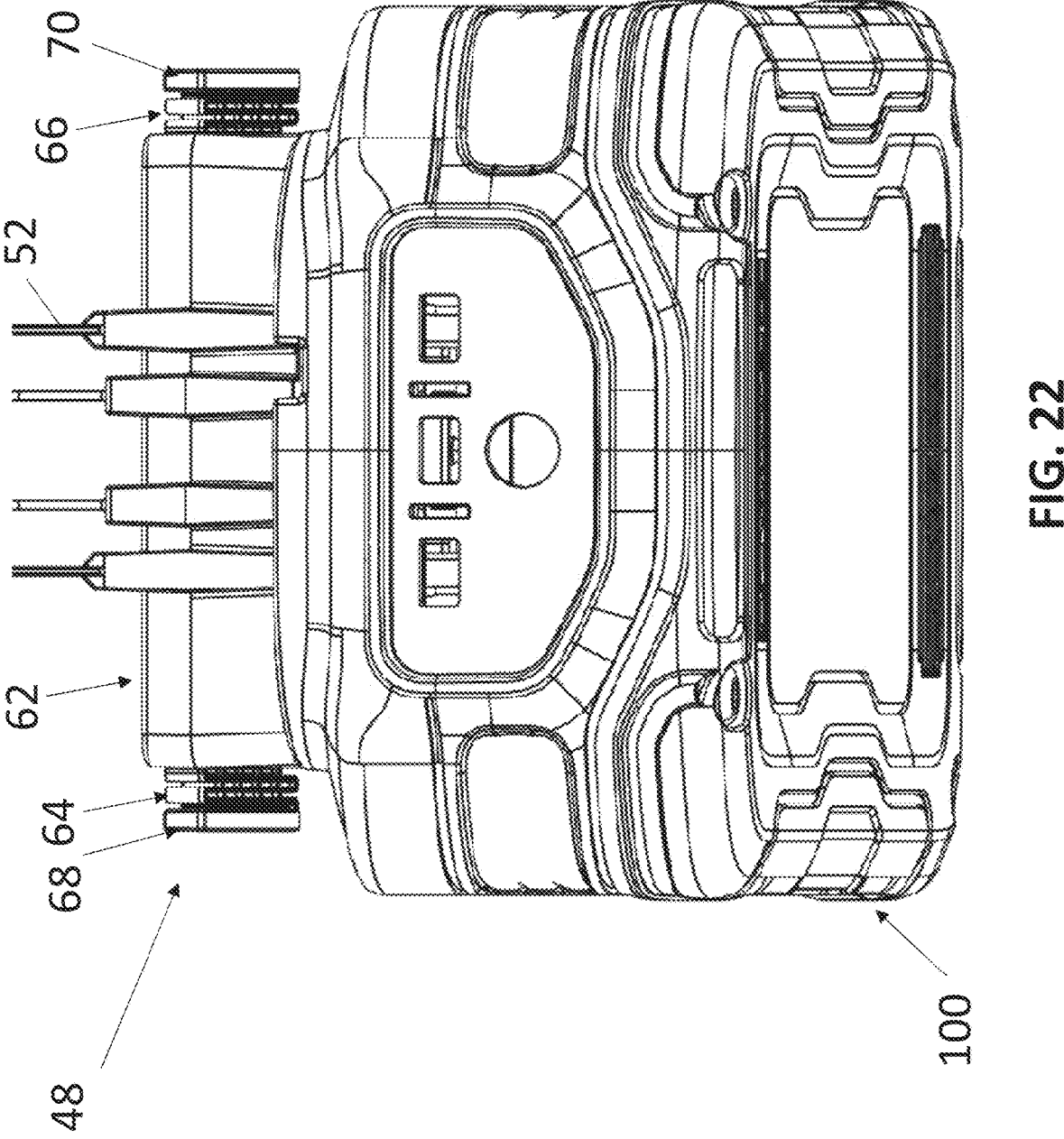
FIG. 22 is a front elevation view of the battery pack interface and the battery pack of FIG. 20.

Referring to FIGS. 1-8, the power tool 10 may include the battery pack interface 48 at least partially received in the interior volume 30 of the receptacle 18. As described herein, the battery pack interface 48 is configured and arranged to intermate, e.g., electromechanically couple, with a correspondingly designed and configured power tool interface 102 (FIG. 17) of the removable battery pack 100, as shown in FIGS. 20-22.

Together, the battery pack interface 48 of the power tool 10 and the power tool interface 102 of the battery pack 100 form the power tool-battery pack interface, which can be referred to as a TP interface. The TP interface allows the battery pack 100 to be coupled to and to be removed from the power tool 10, i.e., the battery pack 100 has a releasably coupled arrangement with the power tool 10. In other words, the TP interface mechanically couples the power tool 10 and the battery pack 100.

In this regard, the TP interface involves an electromechanical coupling system that can be a slide-type coupling system in which corresponding rails and channels engage one another, a tower-type coupling system, in which protruding structures are received in recessed portions, or a different type of coupling system. As described further herein, a slide-type coupling system is provided for the TP interface between the power tool 10 and the battery pack 100, though a different coupling system could be provided without departing from the disclosure.

In the example embodiment, the battery pack interface 48 may include a body 50 and a set of (or a plurality of) power tool terminals 52. In some embodiments, the battery pack interface 48 can be formed by molding the battery pack interface body 50 about the set of power tool terminals 52.

For example, the set of power tool terminals 52 can be placed in a mold and liquid and/or semi-solid plastic material, e.g., an amorphous polymer thermoplastic material (for example acrylonitrile butadiene styrene (ABS) or polycarbonate (PC)), a semi-crystalline polymer material (for example, polypropylene (PP)), and/or another thermoplastic or related polymer material (such as nylon polyamide (PA)), may be, for example, injection molded about the set of power tool terminals 52. In some embodiments, such plastic material can be injected into a mold having an interior cavity with surfaces generally complementary to those of the outer surface of the body 50 of the battery pack interface 48 and allowed to harden, e.g., by cooling or setting, about the power tool terminals 52.

The body 50 of the battery pack interface 48 thus holds the set of power tool terminals 52 in a fixed position relative to each other. The set of power tool terminals 52 can be electrically conductive members that are configured and arranged to mate with a correspondingly designed and configured set of battery pack terminals 104 on the battery pack 100 to conduct electricity between the power tool 10 and the battery pack 100, e.g., so as to supply electric power to one or more components of the power tool 10.

As shown best in FIG. 7, the power tool terminals 52 can be connected to a power tool control assembly/module/electronics/circuitry 54 and/or a power tool motor 56 by a set of power tool wires 58. In this regard, the battery pack 100 can be positioned in electrical communication with the power tool motor 56 via the power tool terminals 52 of the battery pack interface 48 and the wires 58/circuitry 54 therebetween, so as to energize the motor 56 and operate the power tool 10. Accordingly, the power tool 10 can be provided with a trigger 60 or other actuator that can be engaged by a user to actuate the power tool motor 56 and the battery pack 100 to cause actuation of a power tool application element 57 such as a saw blade, wrench, driver, etc. In some embodiments, the trigger 60 could be in electrical communication with a controller such that actuation of the trigger 60 can cause one or more logic signals to be transmitted to one or more field effect transistors (FETs) to activate the motor 56.

In some embodiments, the power tool application element 57 can be at least partially received in a portion of the housing 12 of the power tool 10 or otherwise coupled to the power tool 10, for example, via an anvil, chuck, receiving adapter, etc. It will be understood that the power tool application element 57 can generally be positioned extending forwardly of the remainder of the power tool 10 but could be provided in a different arrangement without departing from the disclosure. The power tool 10 can be provided with or without a tool application element 57, e.g., such that the power tool application element 57 can subsequently be coupled to the power tool 10.

As shown in FIGS. 9-14, the body 50 of the battery pack interface 48 can at least partially define an interface portion or battery pack receiving portion 62, a first vibration isolation portion/component/element 64 (broadly, "first vibration isolation portion/component/element") connected to the battery pack receiving portion 62, a second vibration isolation portion/component/element 66 (broadly, "second vibration isolation portion/component/element") connected to the battery pack receiving portion 62, a first housing attachment/capture portion 68 (broadly, "first housing attachment/capture portion") connected to the first vibration isolation portion 64, and a second housing attachment/capture portion 70 (broadly, "second housing attachment/capture portion") connected to the second vibration isolation portion 66.

The first vibration isolation portion 64, as shown, is positioned between and connected to each of the battery pack receiving portion 62 and the first housing attachment/capture portion 68. Similarly, the second vibration isolation portion 66 can be positioned between and connected to each of the battery pack receiving portion 62 and the second housing attachment/capture portion 70. As described further herein, the vibration isolation portions 64, 66 are formed as part of the body 50 of the battery pack interface 48 and can at least partially isolate the battery pack 100 from one or more forces generated by the power tool 10 in the course of operation thereof.

Although the embodiment(s) illustrated in the figures show a first vibration isolation portion 64 and a second vibration isolation portion 66 for operating in a cooperative manner, it will be understood that a lesser or greater number of vibration isolation portions may be employed. For example, in some embodiments, the first vibration isolation portion and second vibration isolation portion may be combined into a single element. In alternate embodiments, three or more vibration isolation elements may be spaced around the battery pack interface 48.

The battery pack receiving portion 62 of the battery pack interface body 50 can at least partially define a top wall 72 and a pair of side walls 74, 76 and an end wall 78 depending downwardly from the top wall 72 so as to at least partially define a recess 80 defined by the top wall 72 and the side walls 74, 76. In this regard, the top wall 72 can be generally parallel to the XY-plane, the side walls 74, 76 can be generally parallel to the YZ-plane, and the end wall 78 can be generally parallel to the XZ-plane though a different arrangement could be provided without departing from the disclosure.

As shown, respective opposed rails 82, 84 can extend into the recess 80 from the respective side walls 74, 76 so as to at least partially define a first channel 86 between a respective portion of the top wall 72, a respective portion of the side wall 74, and the rail 82 and a second channel 88 between a respective portion of the top wall 72, a respective portion of the side wall 76, and the rail 84. As described further herein, the rails 82, 84 are arranged such that the channels 86, 88 are positioned for at least partially receiving complementary structure of the power tool interface 102 of the removable battery pack 100.

The battery pack receiving portion 62 of the battery pack interface 48 can also at least partially define a catch 90 at least partially forming a recess or hole along the top wall 72 of the battery pack interface 48 facing and/or at least partially forming the lower recess 80, and having a corresponding protrusion extending upwardly from a top surface of the top wall 72. As described herein, the catch 90 is configured and arranged to at least partially receive a complementary latch 110 of the power tool interface 102 of the removable battery pack 100.

Figure 13:
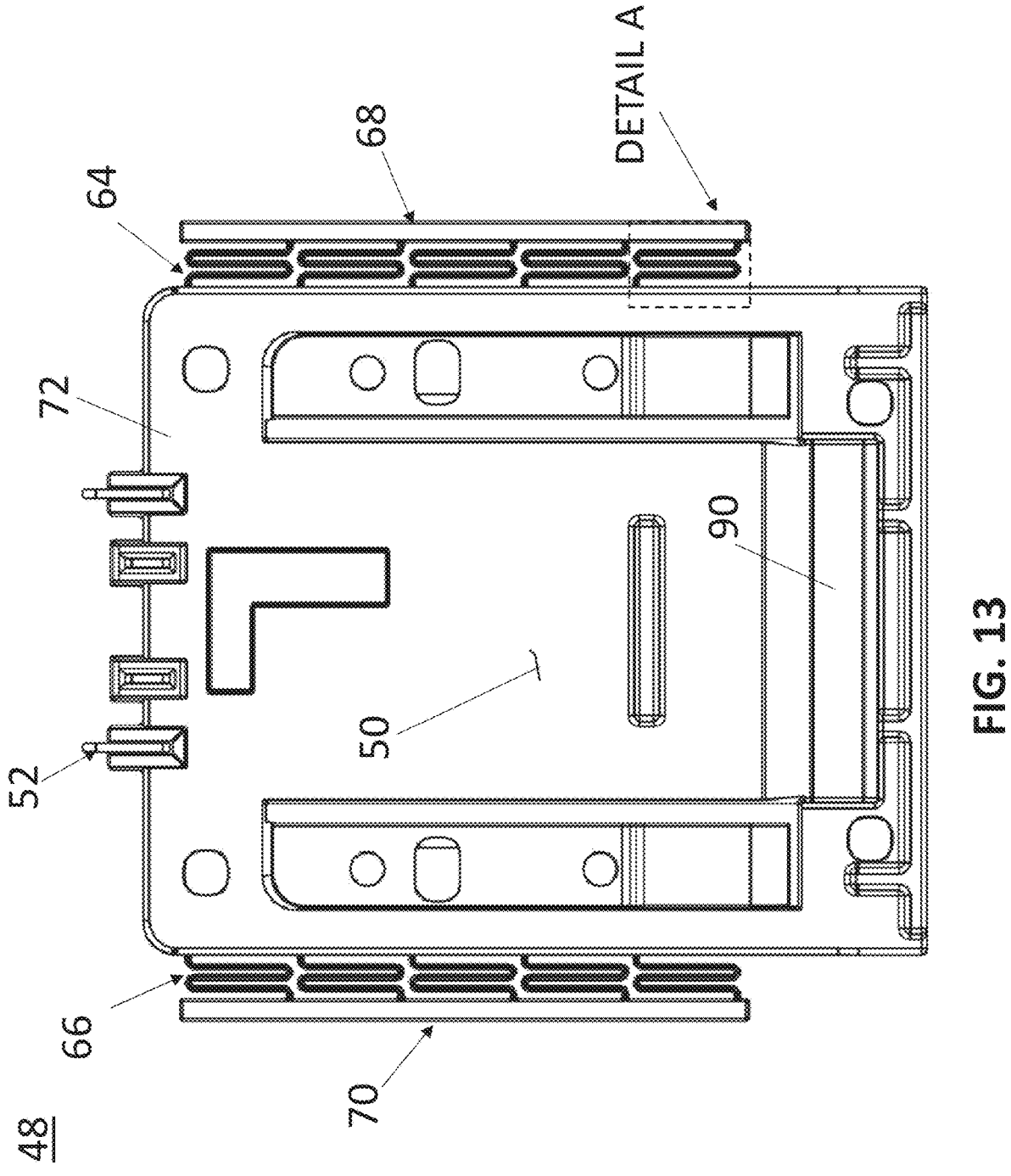
FIG. 13 is a top plan view of the battery pack interface of FIG. 9.
Figure 14:
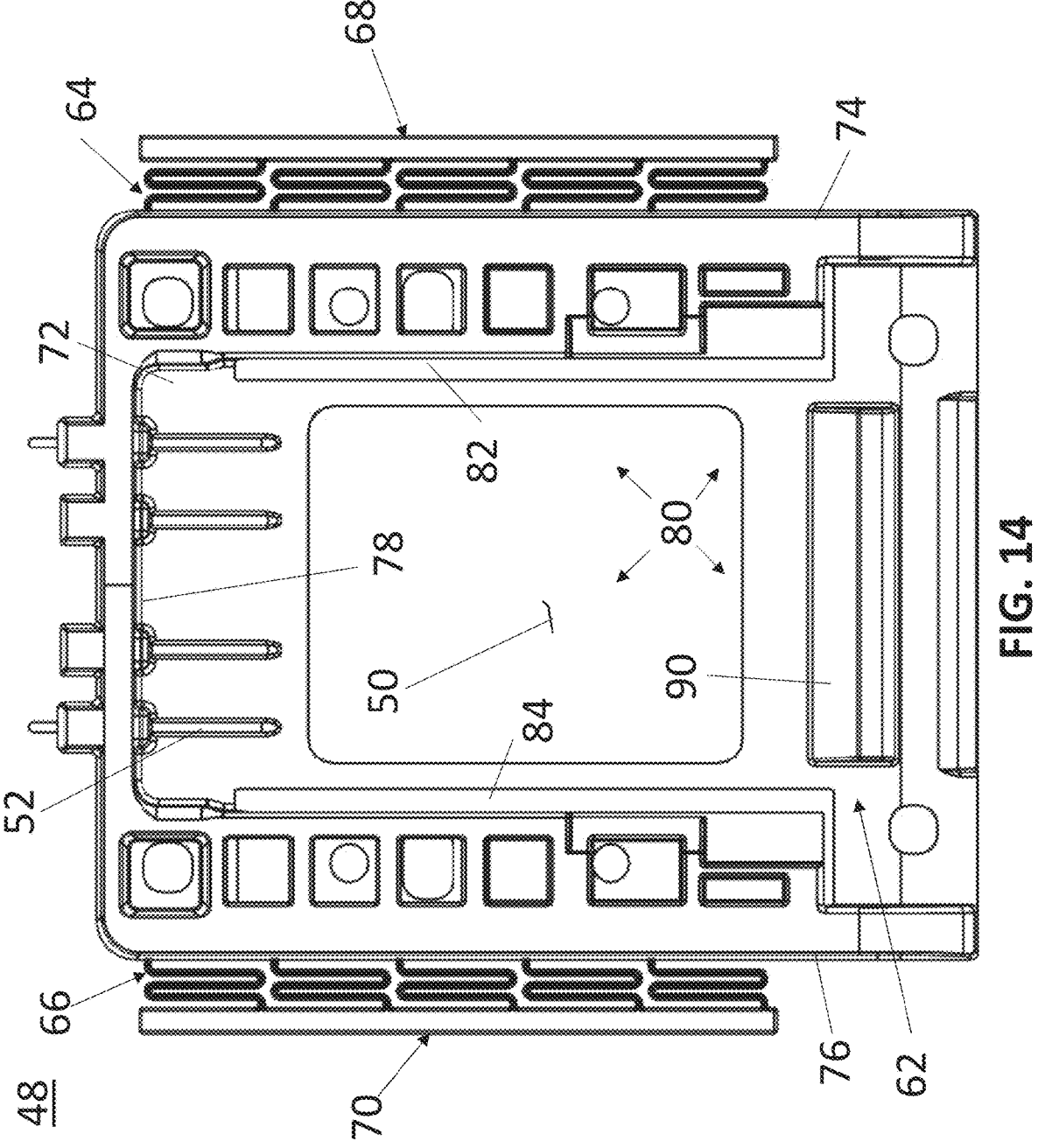
FIG. 14 is a bottom plan view of the battery pack interface of FIG. 9.
Figure 15:
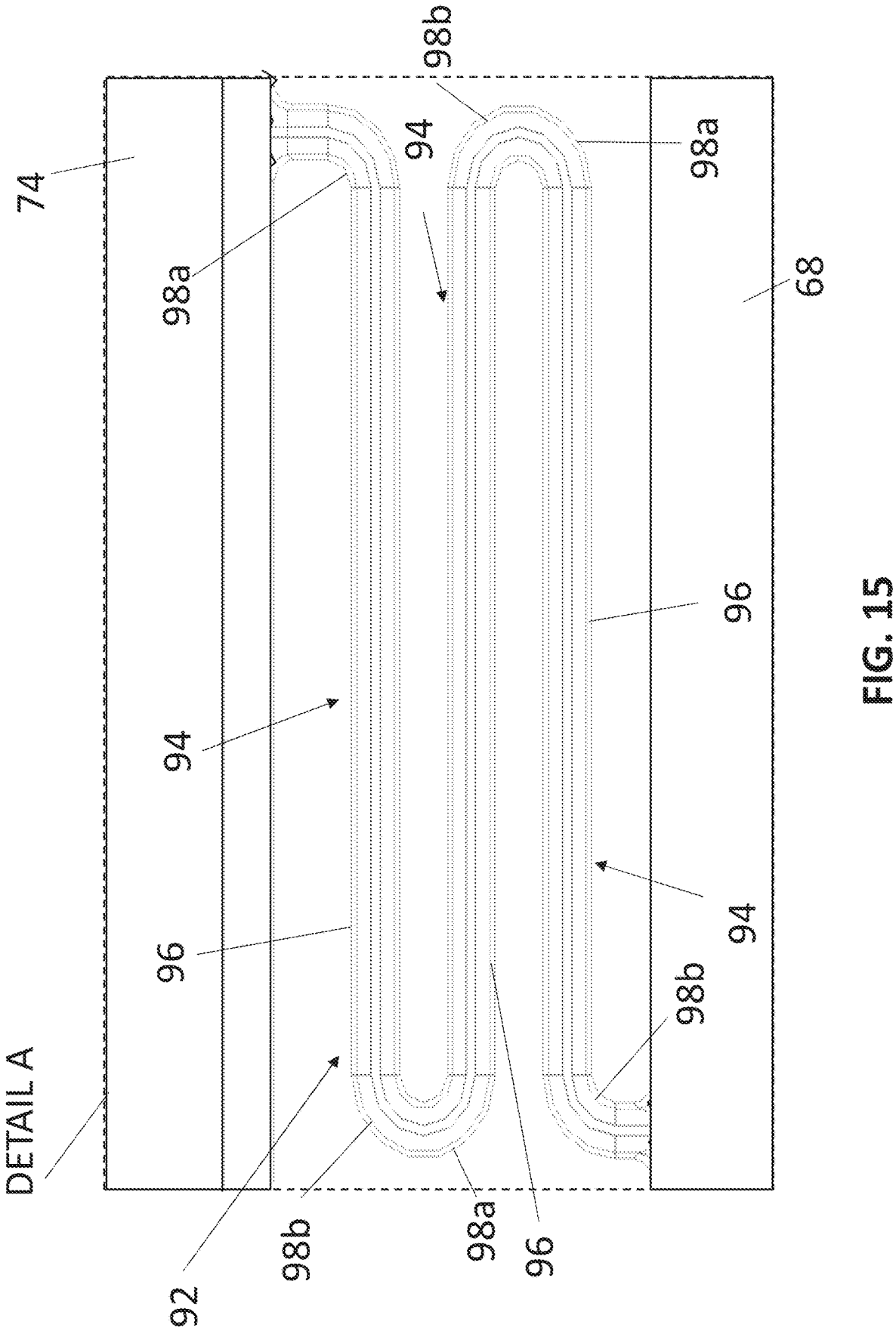
FIG. 15 is an enlarged top plan view of detail area A identified in FIG. 13 showing an example compliant member of the battery pack interface of FIG. 9, shown in isolation for clarity of illustration.

With continued reference to FIGS. 13-15, the first vibration isolation portion 64 of the battery pack interface 48 may include a plurality of compliant members 92 arranged in spaced relation in a direction parallel to the Y-axis. As illustrated in the detail view of FIG. 15, each compliant member 92 may include a plurality of compliant segments 94 in an at least partially repeating pattern along the length of the battery pack interface 48. As shown, the compliant member 92 can have a generally repeating sinusoidal arrangement which may function as a series of consecutive cantilevered beams, where the deflections of the compliant members are a function of the dimensions of the members and the elastic modulus of the material used. It will be understood that alternative configurations using a different arrangement of compliant members could be provided without departing from the disclosure.

As shown in FIG. 15, each compliant segment 94 can include a long/straight arm 96, a first compliant curved arm 98a connected to and extending from a first end of the long arm 96 and a second compliant curved arm 98b connected to and extending from a second end of the long/straight arm 96. The first curved arm 98a may also be connected to the side wall 74 of the battery pack receiving portion 62 or to the second curved arm 98b of an adjacent long/straight arm 96. The second curved arm 98b may also be connected to the housing attachment/capture portion 68 or to a first arm 98a of an adjacent long/straight arm 96, as the case may be.

The body 50 of the battery pack interface 48 can be formed such that at least the respective curved, compliant arms 98a, 98b are provided with an at least partially flexible arrangement relative to a respective long/straight arm 96. In this regard, movement of the respective long/straight arm 96 can transmit one or more forces to the respective curved arm 98a, 98b so as to cause the respective curved arm 98a, 98b to bend or flex in response thereto. In this regard, the respective curved arms 98a, 98b are formed with an at least partially flexible configuration, e.g., so as to at least partially deform in the presence of an applied force.

In some embodiments, and as described further herein, the respective curved arms 98a, 98b can be resiliently configured for moving between a resting state and a compressed state relative to the respective long/straight arms 96. One or more of the long/straight arms 96 may bend and flex about the respective curved arms 98a, 98b in-plane, e.g., through the XZ plane, as the compliant members 92 transition between the resting state and the compressed state. In this regard, one or more of the long/straight arms 96 may tilt relative to one another and/or a respective wall 74, 76 of the battery pack receiving portion 62 of the battery pack interface 48 during transition from the resting state to the compressed state.

Accordingly, individual compliant segments 94 and/or the overall compliant member 92 can be provided with a spring-like arrangement that can facilitate the return of respective compliant segments from the compressed state to the resting state.

Similarly, the second vibration isolation portion 66 of the battery pack interface 48 may include a plurality of compliant members 92 arranged in spaced relation in a direction parallel to the Y-axis, with each compliant member 92 of the second vibration isolation portion 66 of the battery pack interface 48 connected to each of the side wall 76 of the battery pack receiving portion 62 of the battery pack interface 48 and the second housing attachment/capture portion 70.

In this regard, the compliant members 92 of the second vibration isolation portion 66 may be configured and arranged similarly to those described above with respect to the first vibration isolation portion 64, though it will be understood that the compliant members 92 of the second vibration isolation portion 64 can be accordingly mirrored about the YZ-plane.

Figure 16A:
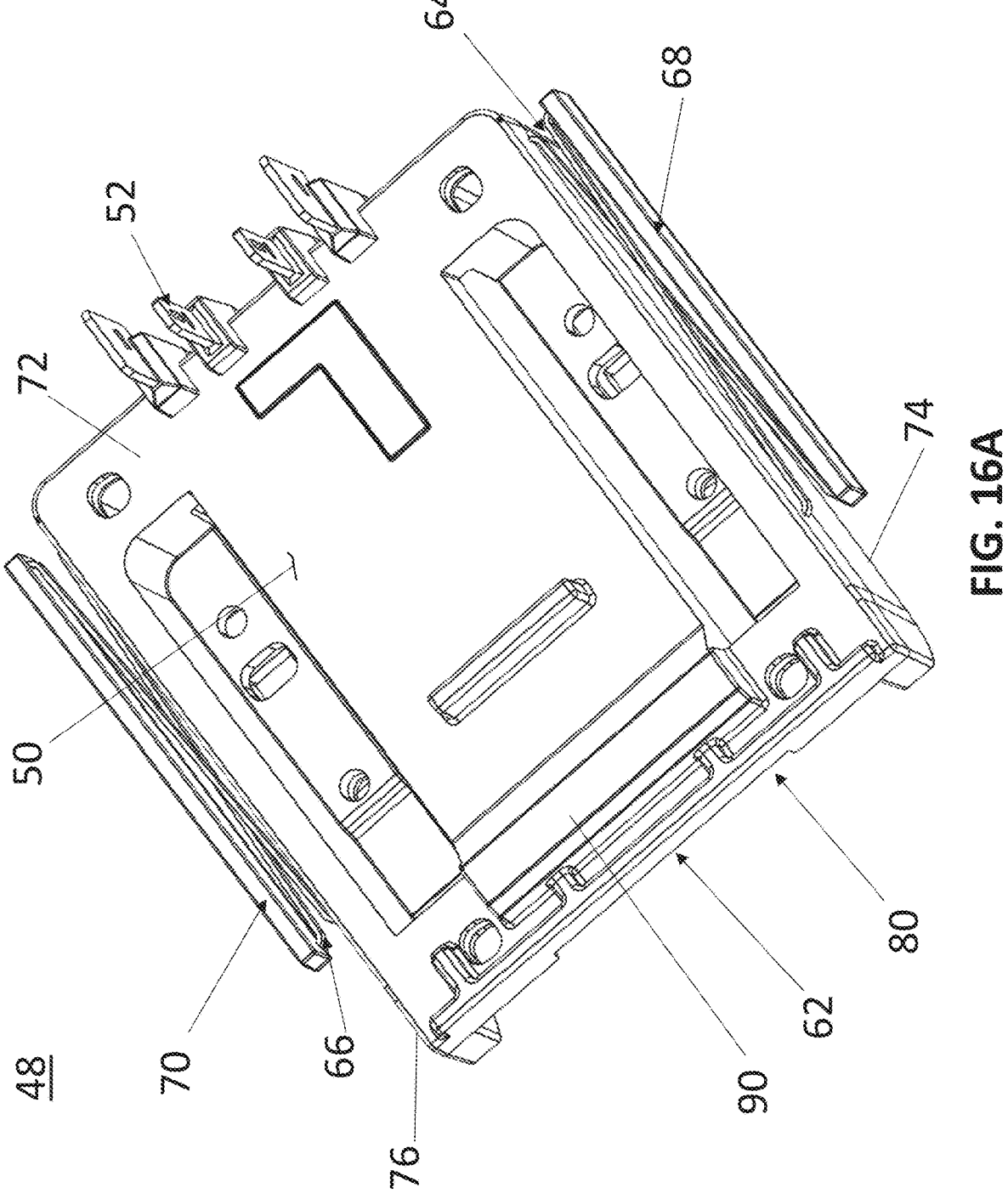
FIG. 16A is an isometric view of an alternative exemplary battery pack interface for use with the power tool of FIG. 1.
Figure 16B:
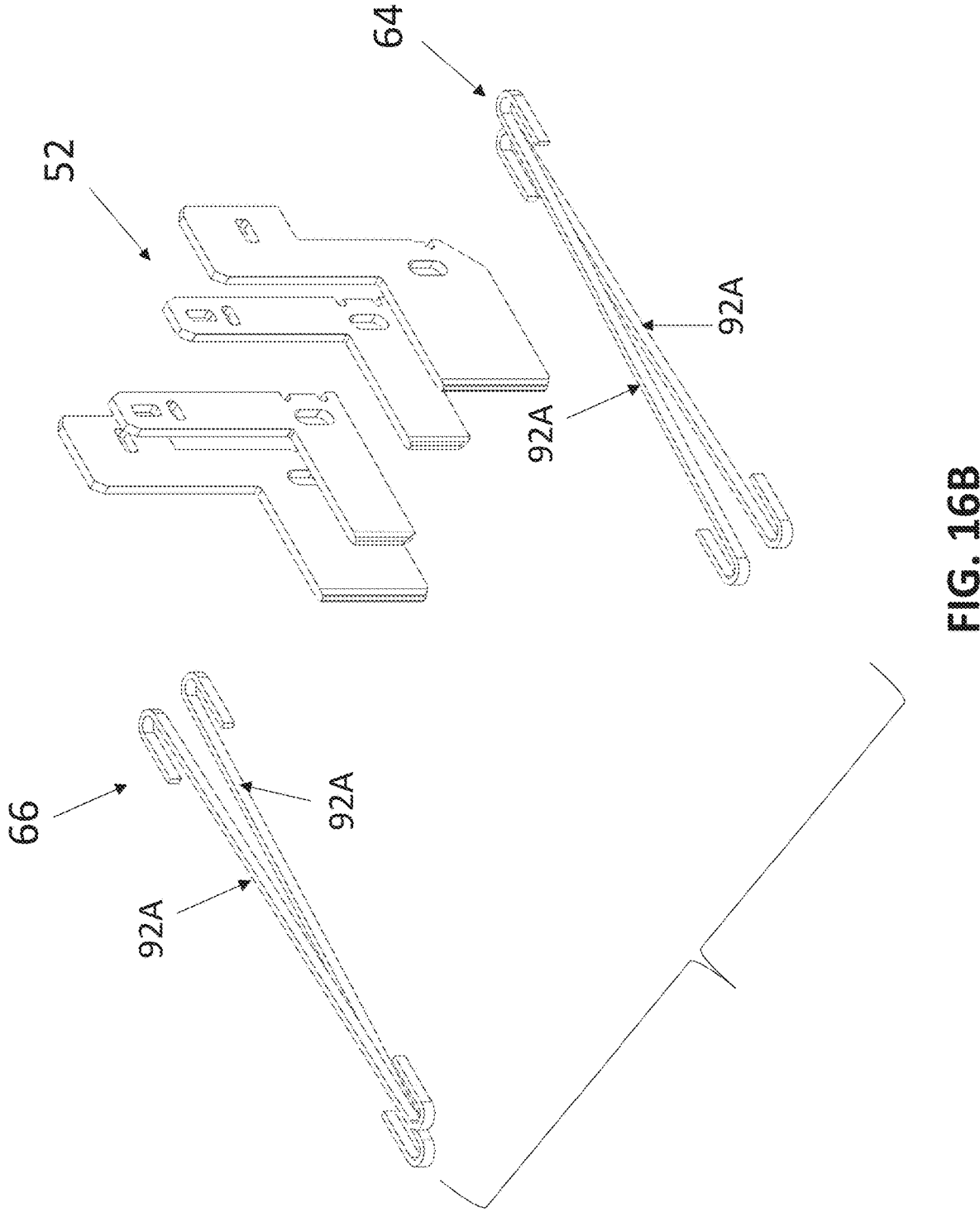
FIG. 16B is an isometric view of the power tool terminals and the vibration isolation portions of the battery pack interface of FIG. 16A shown in isolation for clarity of illustration.

In an alternate embodiment, at least a portion of the battery pack interface 48 may be metallic (e.g., sheet metal, stamped metal) or have metallic reinforcement contained therein. For example, as shown in FIGS. 16A and 16B, the terminals 52 and the first vibration isolation portion 64 and second vibration isolation portion 66 may include metallic components that can be placed in a mold such that the plastic material that forms the battery pack receiving portion 62 and the first housing attachment/capture portion 68 and the second housing attachment/capture portion 70 of the battery pack interface 48 may be injection molded around them to together form the body 50 of the battery pack interface 48.

As shown, the first vibration isolation portion 64 and the second vibration isolation portion 66 can include one or more compliant members 92A having a generally elongate configuration and which can be provided with hooks, flanges, or other anchoring features at opposing ends that may be captured and secured within the surrounding plastic, which may be an amorphous thermoplastic material, a semi-crystalline thermoplastic material, or another plastic material. Accordingly, the battery pack interface 48 of the alternative embodiment shown in FIGS. 16A and 16B can be provided with a body 50 that defines the battery pack receiving portion 62, the vibration isolation portions 64, 66, and the housing attachment/capture portions 68, 70, with the ends of the compliant members 92A integrally formed via molding with the respective housing attachment/capture portions 68/70 and the battery pack receiving portion 62. The compliant members 92A may be arranged for flexibly deforming under applied forces in a manner similar to that described herein with regard to the compliant members 92.

With continued reference to FIGS. 1-15, the battery pack interface 48 can be at least partially received in the interior volume 30 of the receptacle 18 of the power tool 10 such that the first housing attachment/capture portion 68 thereof is at least partially received in the channel 38 and such that the second housing attachment/capture portion 70 thereof is at least partially received in the channel 31. As shown, the housing attachment/capture portions 68, 70 are configured as rails at least partially received in the respective channels 38, 31.

In some embodiments, the housing attachment/capture portions 70, 68 of the battery pack interface 48 can be at least partially constrained from movement relative to the housing 12 between the respective surfaces 32, 34, 36 of the side wall 20 and the respective surfaces 42, 44, 46 of the side wall 22.

The aforementioned configuration of the power tool 10 allows for relative movement of the battery pack receiving portion 62 of the battery pack interface 48 relative to the power tool housing 12 along at least the X-axis within the interior volume 30 of the receptacle 18, e.g., due to the flexible and/or resilient arrangement of the vibration isolation portions 64, 66 of the battery pack interface 48. In some embodiments, the vibration isolation portions 64, 66 of the battery pack interface 48 can facilitate at least partial movement of the battery pack receiving portion 62 thereof along one or both of the Y-axis and the Z-axis relative to the power tool housing 12.

In this regard, the power tool housing 12 is able to move at least partially independently of the battery pack receiving portion 62 of the battery pack interface 48. As such, vibrations produced by the power tool motor 56 and/or the power tool application element 57 that are translated to the power tool housing 12 may not be translated to an attached battery pack 100 or can be minimized, inhibited, or otherwise attenuated such that the battery pack receiving portion 62 and battery pack 100 coupled thereto is at least partially isolated from vibrations by the vibration isolation portions 64, 66.

The aforementioned arrangement is such that the battery pack interface 48 can be attached to the remainder of the power tool 10 and oriented with the recess 80 positioned facing downwardly for at least partially receiving a battery pack 100.

FIGS. 17-19 illustrate an example battery pack 100 that can be mated and used in combination with the power tool 10 or another example power tool of a set as described above. The battery pack 100 can include a battery pack housing 112 with an upper housing portion 112*a* and a lower housing portion 112*b*, though it will be understood that the battery pack 100 can have a different housing configuration without departing from the disclosure.

The upper housing portion 112*a* and the lower housing portion 112*b* can be configured and arranged to mate together to form an interior cavity within which a set of battery cells, electronics, and other components of the battery pack 100 can be held. While the battery pack 100 may include cylindrical lithium-ion (Li-ion) battery cells, it will be understood that the battery pack 100 may include other types of battery cell chemistries and form factors without departing from the disclosure.

The battery pack 100 can also include a power tool (PT) interface 102, as referenced above. The power tool interface 102 can be configured and arranged to mate with and coupled to the battery pack interface 48 of the power tool 10.

In the example embodiment, the power tool interface 102 may include a set of slots 114 at least partially defined in the upper housing portion 112*a* and a set of (or a plurality of) battery pack terminals within the interior cavity and aligned with the set of slots 114. The set of battery pack terminals of the battery pack 100 is thus designed and configured to mate with the correspondingly designed and configured set of power tool terminals 52 of the battery pack interface 48 to transfer electricity between the power tool 10, e.g., the motor 56 of the power tool 10, and the battery pack 100.

The power tool interface 102 of the battery pack 100 can also at least partially define a set of flanges or rails 106 adjacent a respective set of channels 108. The set of rails 106 and channels 108 are configured for mechanical cooperation with the correspondingly designed set of rails 82, 84 and channels 86, 88 of the battery pack interface 48 of the power tool 10.

The power tool interface 102 can also include a latch 110 and an activation button 116 operably coupled to the latch 110. For example, the activation button 116 can be moveable relative to the housing 112 to cause the latch 110 to withdraw at least partially downwardly toward and/or into the housing 112, to move forwardly or rearwardly, and/or to at least partially pivot relative to the housing 112. The latch 110 can be configured and arranged for being received by the correspondingly designed catch 90 of the battery pack interface 48 of the power tool 10.

The example battery pack 100 can also operate and mate with various other power tools in a similar manner to that described above, for example, such that the battery pack 100 is interchangeable among the power tool 10 and other power tools in a set.

With additional reference to FIGS. 20-22, in order to couple the battery pack 100 to the power tool 10, the power tool interface 102 of the battery pack 100 can be at least partially received in the recess 80 of the battery pack receiving portion 62 of the battery pack interface 48. For example, the rails 106 of the battery pack 100 can be at least partially received in the respective channels 86, 88 of the battery pack interface 48, while the rails 82, 84 of the battery pack interface 48 are simultaneously at least partially received in the respective channels 108 of the battery pack 100. In some embodiments, the battery pack 100 can be coupled to the battery pack interface 48 of the power tool 100 in a slidable arrangement.

Such coupling of the battery pack 100 and the battery pack interface 48 is such that the latch 110 extending upwardly from the battery pack 100 can be at least partially received in the catch 90 of the battery pack interface 48. For example, the latch 110 can be at least partially received in a recessed portion of the catch 90 oriented facing and/or at least partially defining the lower recess 80 of the battery pack interface 48.

In order to facilitate disengagement or uncoupling of the battery pack 100 and the battery pack interface 48, the activation button 116 can be moved by a user to at least partially move the latch 110 out of alignment with the catch 90 of the battery pack interface 48, e.g., such that the rails 106 and channels 108 of the battery pack 100 can be slidably disengaged from the rails 82, 84 and channels 86, 88 of the battery pack interface 48.

Coupling of the battery pack 100 to the battery pack interface 48 is such that the slots 114 in the housing 112 of the battery pack 100 are aligned to receive and contact the power tool terminals 52 of the battery pack interface 48, which are in turn in electrical communication with the circuitry 54 and wires 58 of the power tool 10, so as to place the motor 56 in electrical communication with the battery 100 and any electrical power stored therein.

Accordingly, a user can pull the trigger 60 or another actuator to complete or facilitate completion of an electric circuit between the battery pack 100 and the motor 56. The motor 56 can, in turn, be powered to impart motion, e.g., linear motion, reciprocating motion, rotational motion (torque), etc., to the tool application element 57.

Figure 23:
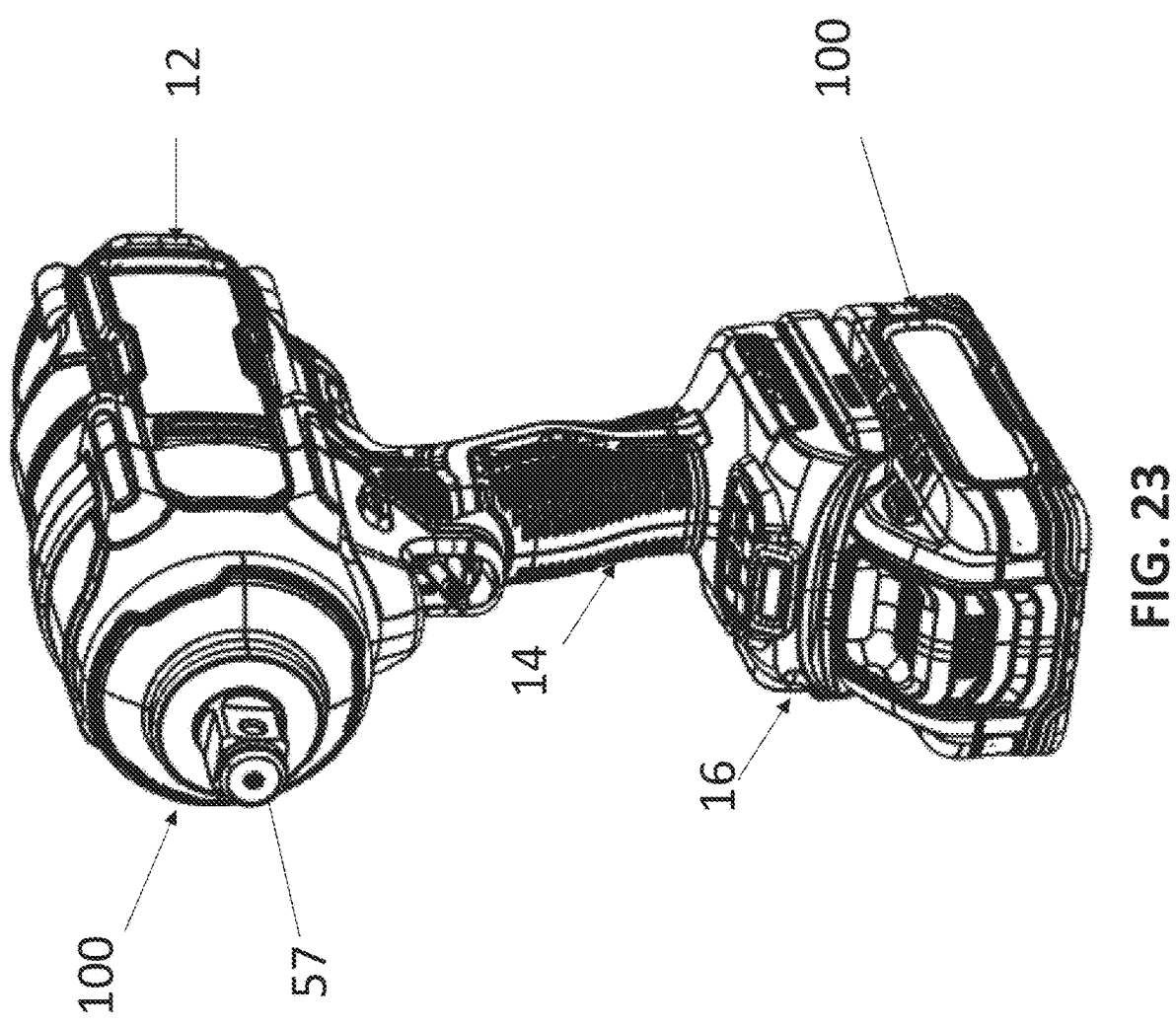
FIG. 23 is an isometric view of the power tool of FIG. 1 shown coupled with the battery pack of FIG. 17 according to an example embodiment of the disclosure.
Figure 24:
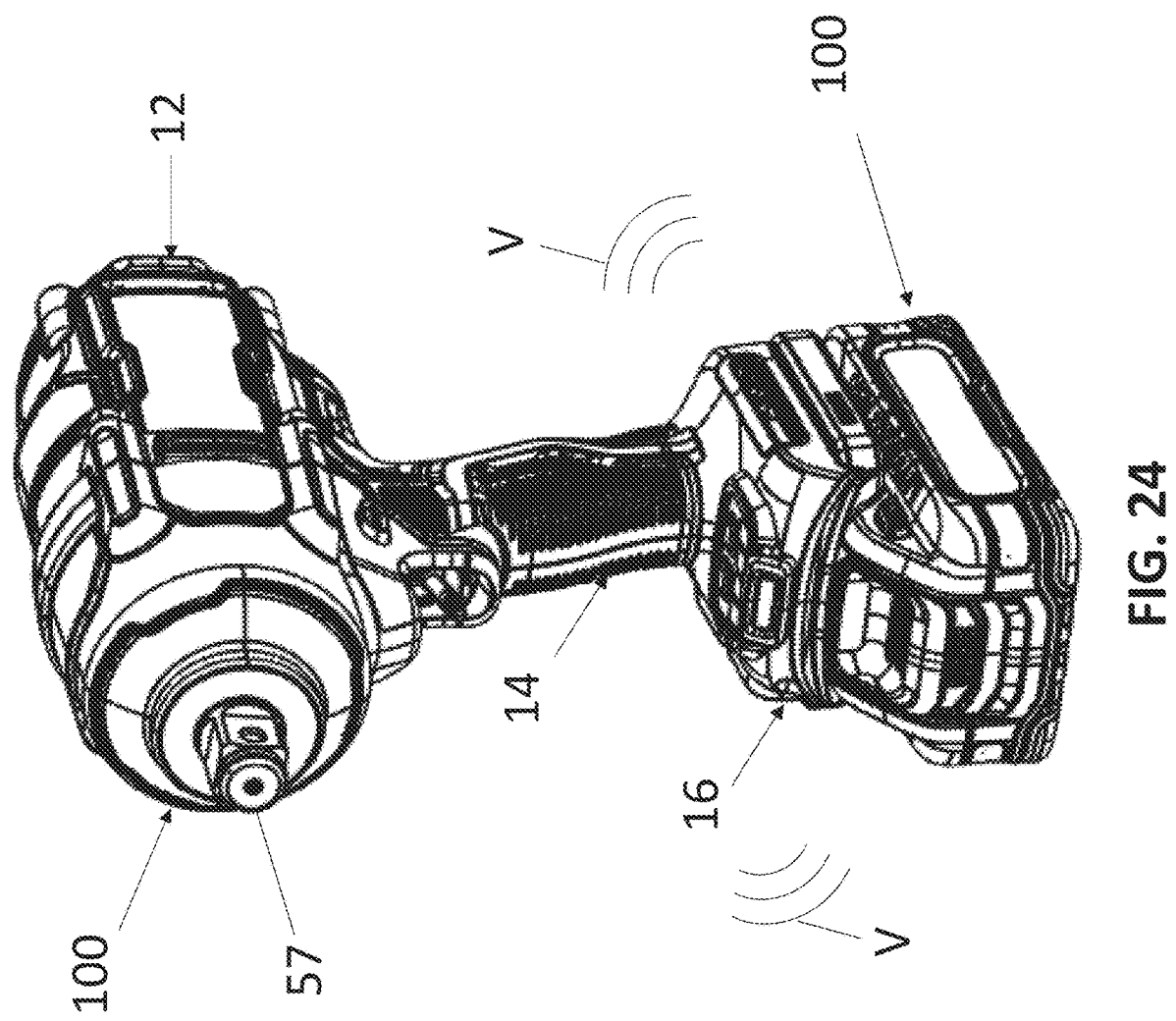
FIG. 24 is an isometric view showing the power tool and the battery pack of FIG. 23 in operation.

With reference to FIGS. 23-24, such operation of the motor 56 and/or the tool application element 57 (e.g., directly due to forces of the motor 56 and/or subsequent inertia) can cause one or more vibrations, e.g., forced oscillatory motion that is associated with rocking, shaking, bumping or buzzing sensations, etc., and schematically illustrated with reference numeral V in FIG. 24, can be produced and transmitted to other portions of the power tool 10. It will be further understood that one or more vibrations V can be due to and/or augmented by handling of the power tool 10 by a user.

When a battery pack 100 is coupled to the power tool 10, vibrations V can be additionally transmitted to the TP interface such that disruption or inhibition of electrical contact between the battery pack 100 and the power tool terminals 52 and/or damage to the battery pack interface 48 and/or battery pack 100 could otherwise occur.

However, the arrangement of the vibration isolation portions 64, 66 of the battery pack interface 48 is such that one or more of the compliant members 92 thereof can reconfigure from the resting state to the compressed state to at least partially absorb and/or dissipate a portion of the vibrations V before they are transmitted to the battery pack receiving portion 62 of the battery pack interface 48 to which the battery pack 100 is coupled and thereafter to the battery pack 100.

For example, vibrations V in the form of forces along the X-axis can be transmitted from the housing 12 of the power tool 10 to the respective housing attachment/capture portions 68, 70 of the battery pack interface 48 in contact therewith. The respective housing attachment/capture portions 68, 70 can thus transmit the force(s) to one or more of the compliant members 92 connected thereto to cause one or more of the compliant segments 94 to transition from the resting state to the compressed state.

For example and with additional reference to FIG. 25-28, in a resting state, a respective long/straight arm 96 can be generally parallel to a respective adjacent long/straight arm 96 and spaced a distance D1 along the X-axis relative to a respective adjacent long/straight arm 96, the side wall 74 of the battery pack receiving portion 62 of the battery pack interface 48, or the housing attachment/capture portion 68.

Figure 27:
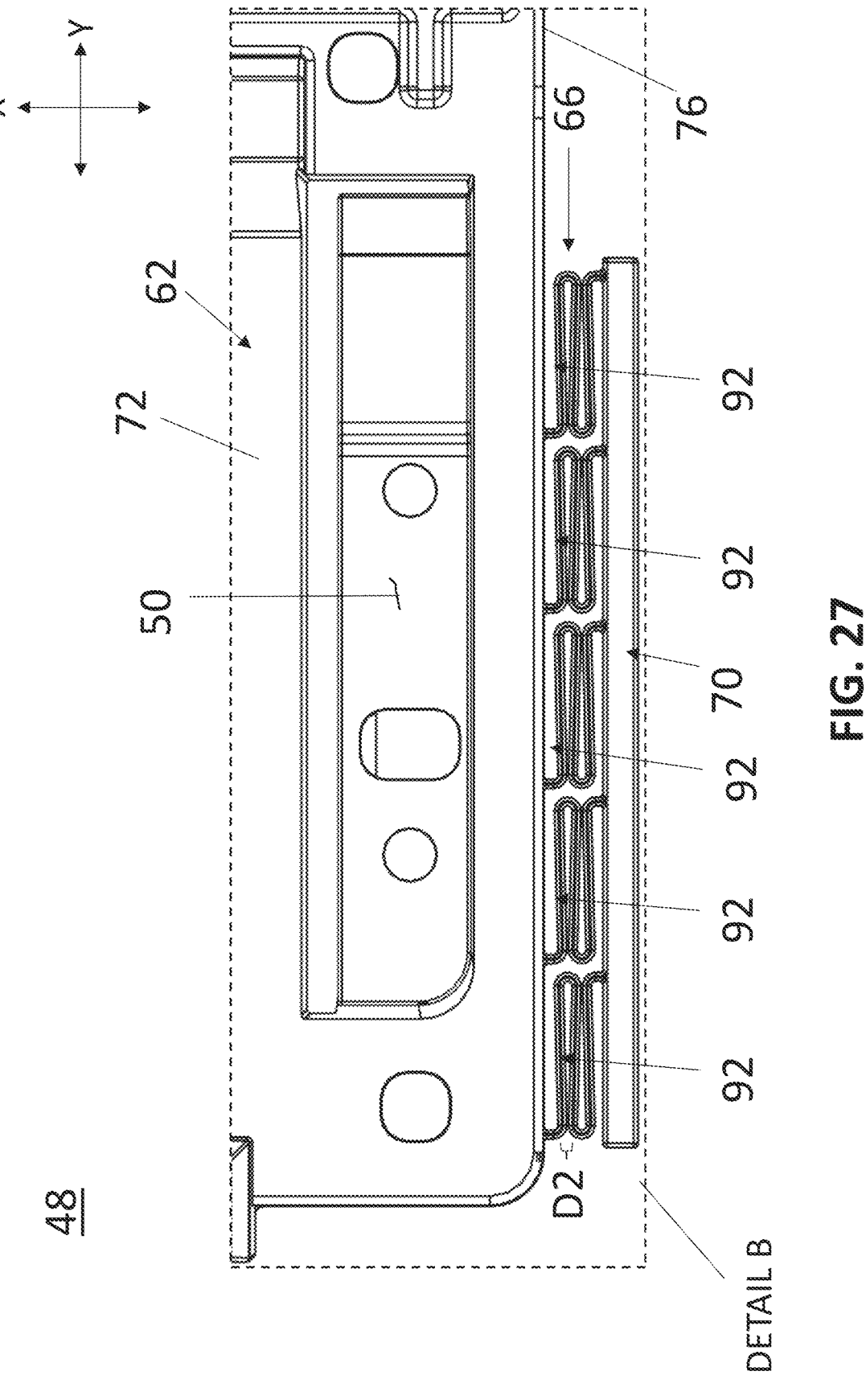
FIG. 27 is an enlarged view of detail area B identified in FIG. 25 showing compliant members of the battery pack interface in a compressed state.
Figure 28:
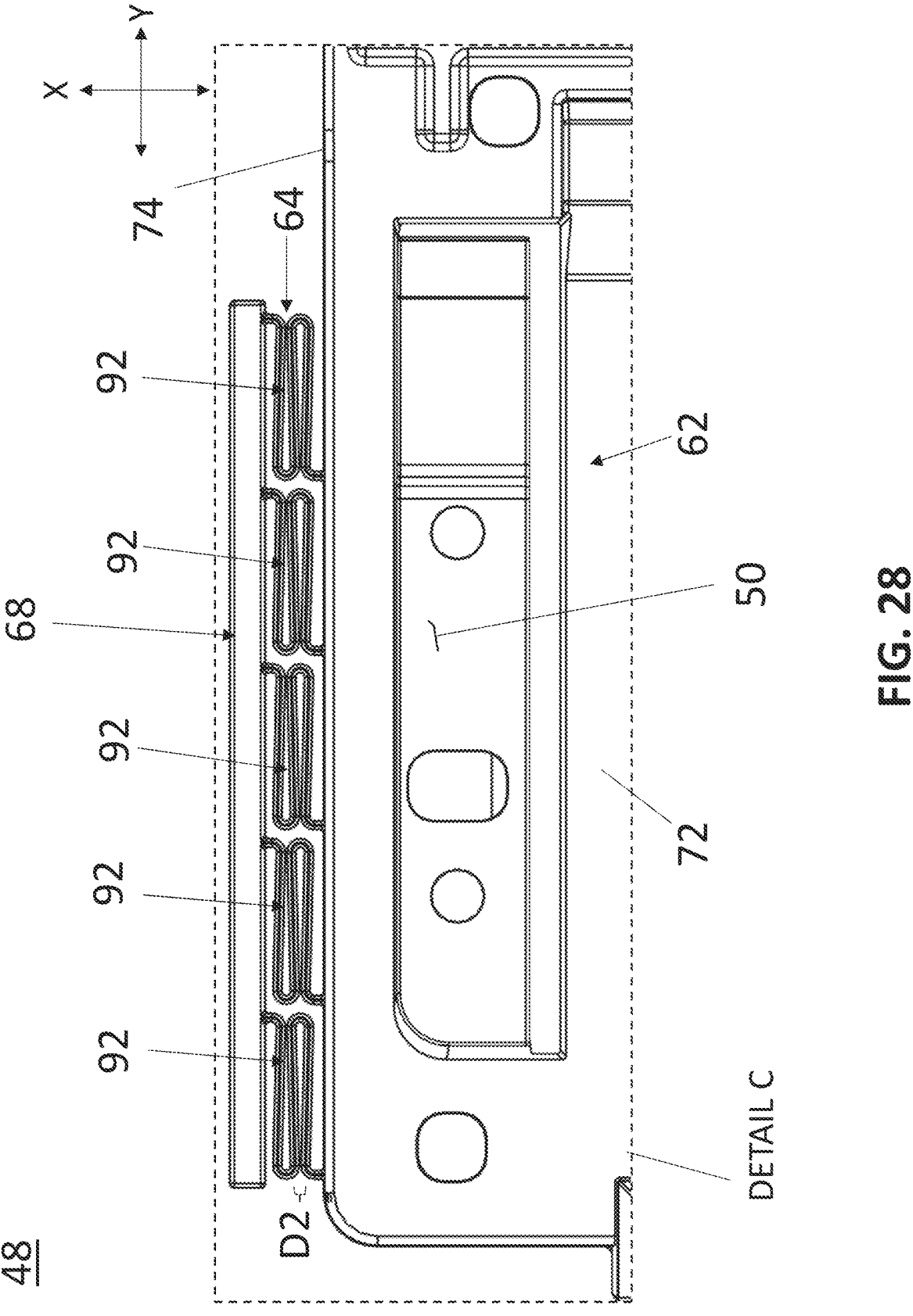
FIG. 28 is an enlarged view of detail area C identified in FIG. 25 showing compliant members of the battery pack interface in a compressed state.

As shown in FIGS. 27 and 28, when one of the vibration isolation portions 64, 66 is in a compressed state (the opposing vibration isolation portion will be in a resting state or an extended state), in which a respective curved arm 98a, 98b is at least partially bent under the influence of an applied force, the respective long/straight arm 96 can tilt, deflect, or otherwise move at least partially along the X-axis, e.g., through the XZ plane, toward a respective adjacent long/straight arm 96, the respective side wall 74/76 of the battery pack receiving portion 62 of the battery pack interface 48, or the respective housing attachment/capture portion 68/70 so as to be spaced a distance D2 therefrom. The distance D2 can be measured at a point along the respective long/straight arm 96 relative to a respective arm 96, side wall 74/76, or housing attachment/capture portion 68/70 along the X-axis corresponding to a point from which the distance D1 was measured such that the distance D2 may be smaller than the distance D1 in the compressed state.

Accordingly, when a respective vibration isolation portion 64, 66/compliant member 92 thereof is in an at least partially compressed state, one or more of the curved arms 98a, 98b of a respective compliant member 92 can at least partially bend, at least partially absorbing the applied force associated with the vibrations V and at least partially dissipating such force, for example, in the form of heat or noise, so as to dampen the vibrations V and at least partially isolate the battery pack interface 48 and battery pack 100 coupled thereto from such vibrations V.

As described above, respective compliant members 92 can be resiliently configured to return from the compressed state to the resting state, e.g., such that one or more forces absorbed from the vibrations V in the manner described above can be returned toward the battery pack receiving portion 62 and battery pack 100 in a delayed and attenuated manner. In some embodiments, such resiliently returning forces from respective compliant members 92 of one of the vibration isolation portions 64, 66 of the battery pack interface 48 in response to vibrations V can be at least partially received by respective compliant members 92 toward the other of the vibration isolation portions 64, 66, and so on, such that the vibration isolation portions 64, 66 of the battery pack interface 48 can cooperate to reciprocate and dissipate forces associated with vibrations V until they are fully dissipated or otherwise acceptably minimized so as to avoid negative effects on the battery pack interface 102.

Figure 25:
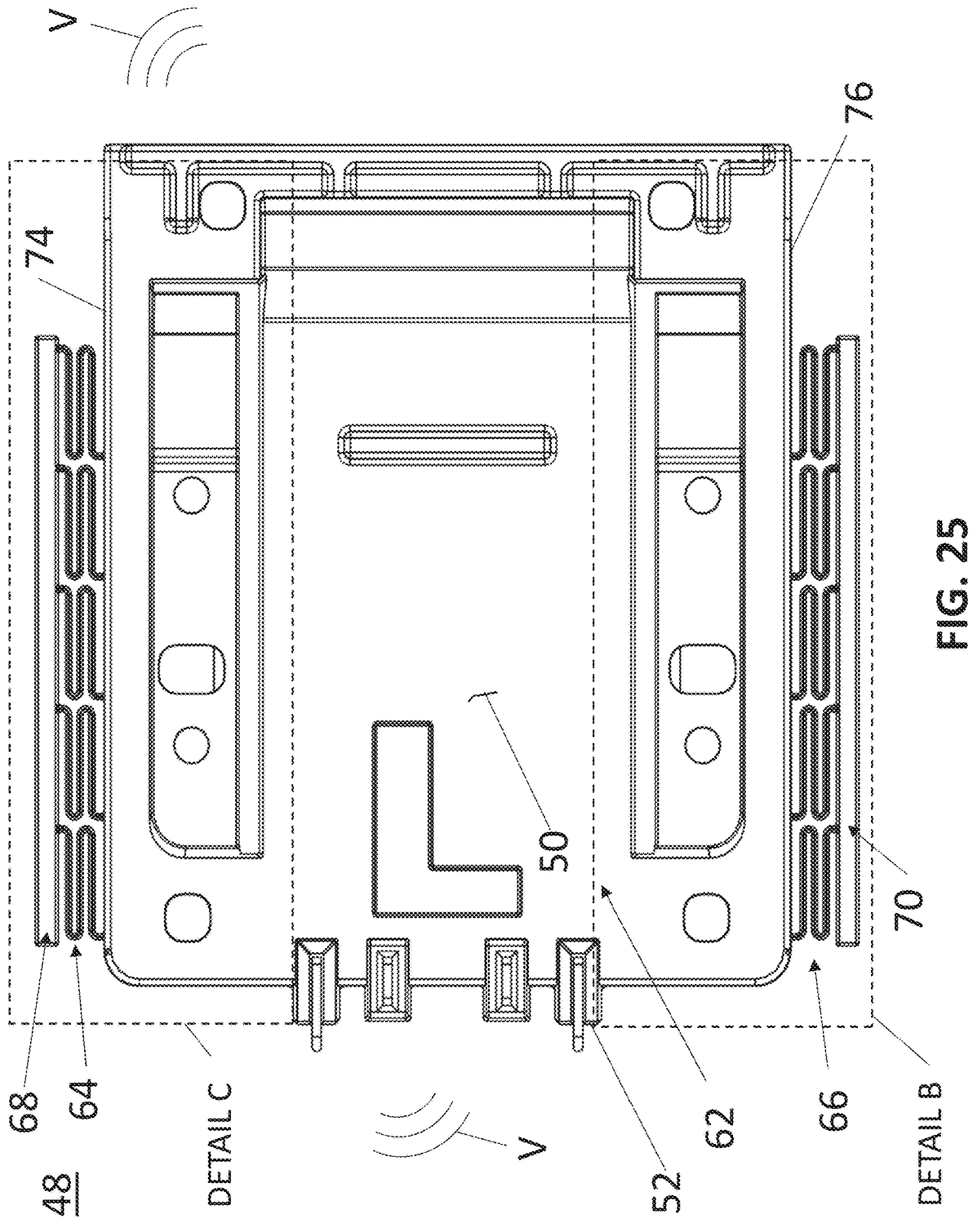
FIG. 25 is a plan view of the battery pack interface of FIG. 9 shown in the presence of one or more vibrations.
Figure 26:
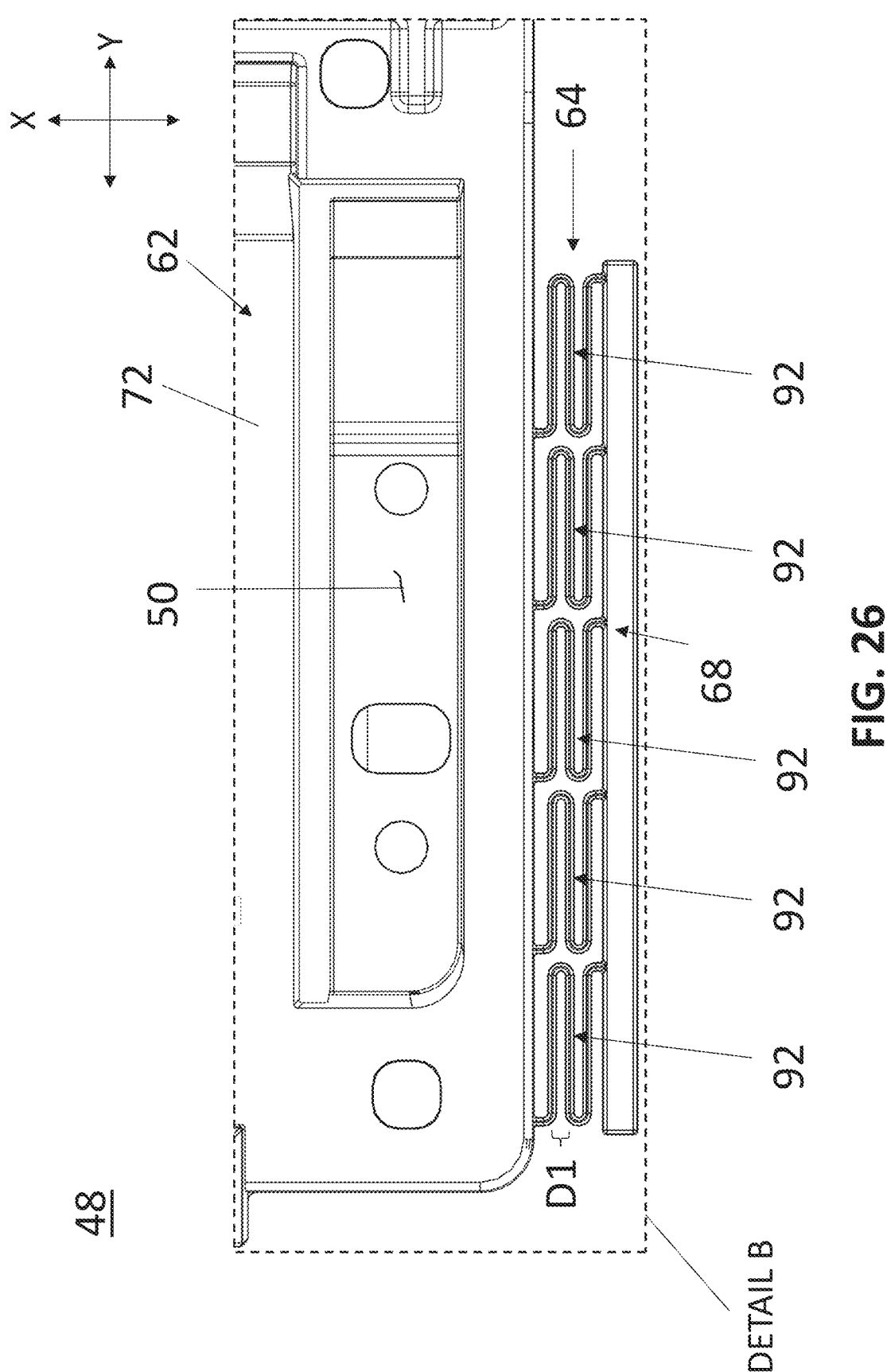
FIG. 26 is an enlarged view of detail area B identified in FIG. 25 showing compliant members of the battery pack interface in a resting state.
Figure 29:
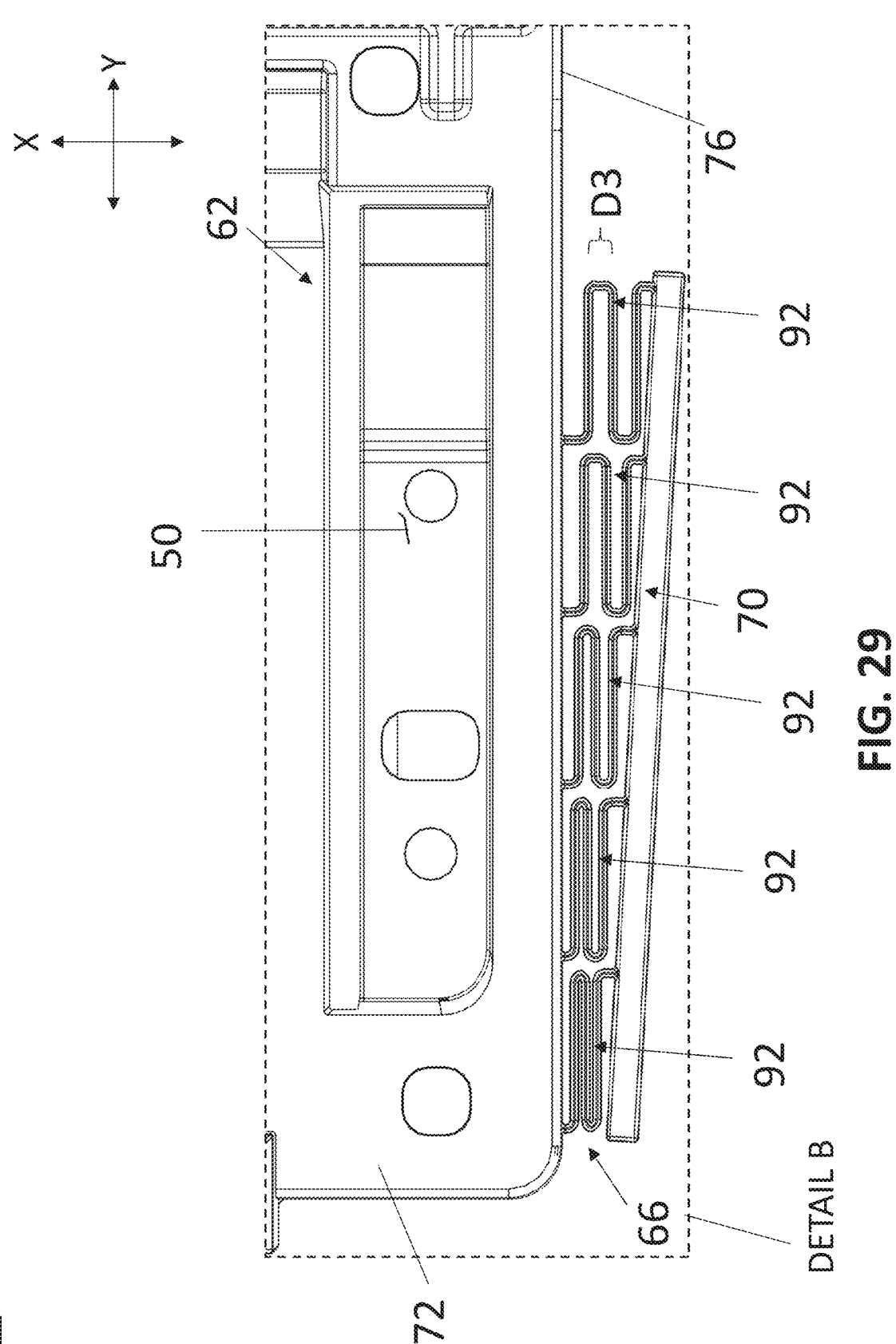
FIG. 29 is an enlarged view of detail area B identified in FIG. 25 showing compliant members of the battery pack interface in a third state.

It will be understood that such movement of portions of the battery pack interface 48 facilitated by vibrations V can cause the battery pack receiving portion 62 and battery pack 100 coupled thereto to shift along the X-axis, e.g., up and down from the perspective of FIG. 25, prior to reaching an equilibrium point. Such movement can include situations in which vibrations V cause at least partial torque about the Z-axis, resulting in an asymmetrically loaded condition along the X-axis, as illustrated in FIG. 29.

In such situations, torsional forces about the Z-axis can cause the compliant members 92 of a respective vibration isolation portion 64, 66 arranged along the Y-axis to experience different loading conditions. In this regard, one or more compliant member 92/compliant segment 94 can be provided in a third state or an at least partially expanded state, in which a respective curved arm 98a, 98b is at least partially bent into a widened arrangement under the influence of one or more tensile forces such that at least a portion of a respective long arm/straight arm 96 can be spaced a distance D3 along the X-axis relative to a respective adjacent long arm/straight arm 96, the respective side wall 74/76 of the battery pack receiving portion 62 of the battery pack interface 48, or the respective housing attachment/capture portion 68/70. The distance D3 can be measured at a point along the respective long/straight arm 96 relative to a respective arm 96, side wall 74/76, or housing attachment/capture portion 68/70 along the X-axis corresponding to a point from which the distance D1 was measured such that the distance D3 may be greater than the distance D1 in the expanded state. It will be further understood that, in symmetric loading conditions along the X-axis, the compliant members 92 of one vibration isolation portion 64/66 can be in an at least partially expanded state while the compliant members 92 of the other vibration isolation portion 64/66 are in an at least partially compressed state.

Accordingly, torsional loading about the Z-axis can result in the compliant members 92 of a given vibration isolation portion 64/66 having a respective long arm/straight arm 96 being spaced a distance between and including D1 and D3 along the X-axis relative to a respective adjacent long arm/straight arm 96, the respective side wall 74/76 of the battery pack receiving portion 62 of the battery pack interface 48, or the respective housing attachment/capture portion 68/70 to various degrees depending on the location of the compliant member 92 along the Y-axis.

In some embodiments, the vibration isolation portions 64, 66 of the battery pack interface 48 can facilitate at least partial movement in the Y-direction and/or the Z-direction. Such movement could involve at least partial reconfiguration one or more compliant members 92 from a resting state to a compressed state as described above, or could involve inherent flexibility of the material of the body 50 of the battery pack interface 48. A change in the dimensions, shape, and/or number of compliant members 92 may be used to configure the relative stiffness along and around the axes of the power tool 10.

It will be further understood that the vibration isolation portions 64, 66 of the battery pack interface 48 are arranged to perform in a cooperative manner. For example, as one or more of the compliant members 92 of one of the vibration isolation portions 64, 66 of the battery pack interface 48 are transitioned to a compressed state, with a corresponding shift of position of at least the battery pack receiving portion 62 in the receptacle 18 of the power tool housing 12 along the X-axis, can cause one or more of the compliant members 92 of the other vibration isolation portion to transition to an expanded state.

The aforementioned arrangement of the battery pack interface 48 provides a power tool 10 with interface capabilities for releasably coupling to a battery pack 100 for providing electrical power to the power tool 10, while incorporating vibration isolation features that minimize, inhibit, prevent, and/or otherwise avoid adverse effects on the battery pack interface 48 and/or the battery pack 100. Such a solution can be provided through a monolithically formed body 50 that may obviate a need for separately formed and assembled components, which can streamline manufacturing and allow for the selection and arrangement of a single material with desirable properties.

It will be understood that one or more components of the power tool 10 and associated features can be differently configured without departing from the disclosure.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A power tool, comprising:
a power tool housing; and
a battery pack interface at least partially received in the power tool housing,
the battery pack interface comprising a body at least partially defining a battery pack receiving portion for receiving a battery pack and at least one vibration isolation portion extending towards the power tool housing, the battery pack receiving portion monolithically formed with the at least one vibration isolation portion, the at least one vibration isolation portion for at least partially isolating a battery pack from one or more forces generated by the power tool.

2. The power tool of claim 1, wherein the battery pack receiving portion and the at least one vibration isolation portion comprise a plastic.

3. The power tool of claim 2, wherein the plastic is selected from the group consisting of an amorphous thermoplastic material and a semi-crystalline thermoplastic material.

4. The power tool of claim 1, wherein the at least one vibration isolation portion comprises at least one compliant member.

5. The power tool of claim 4, wherein the at least one compliant member comprises metal.

6. The power tool of claim 4, wherein the at least one compliant member comprises a plurality of compliant segments, at least one compliant segment of the plurality of compliant segments comprises a long arm and a curved arm extending from the long arm.

7. The power tool of claim 6, wherein the curved arm of the at least one compliant segment is flexibly arranged relative to the respective long arm.

8. The power tool of claim 7, wherein the curved arm of the at least one compliant segment is resiliently configured for moving between a resting state and a compressed state relative to the respective long arm.

9. The power tool of claim 8, wherein the curved arm of the at least one compliant segment is connected to a long arm of an adjacent compliant segment of the plurality of compliant segments.

10. The power tool of claim 9, wherein the long arm of the at least one compliant segment of the plurality of compliant segments is in a generally spaced and parallel relation with a long arm of a respective adjacent compliant segment.

11. The power tool of claim 10, wherein the at least one vibration isolation portion is a first vibration isolation portion extending from the battery pack receiving portion, and the body of the battery pack interface at least partially defines a second vibration isolation portion extending from an opposite side of the battery pack receiving portion from the first vibration isolation portion.

12. The power tool of claim 8, wherein the at least one vibration isolation portion is connected to each of the battery pack receiving portion and a housing attachment portion of the body, the housing attachment portion at least partially received in a receptacle in the power tool housing.

13. The power tool of claim 12, wherein the housing attachment portion comprises a rail at least partially received in a channel in the receptacle in the power tool housing.

14. The power tool of claim 8, wherein the at least one compliant member comprises a plastic material selected from the group consisting of amorphous thermoplastic and semi-crystalline thermoplastic.

15. The power tool of claim 14, wherein the plastic is an injection molded plastic.

16. A method of assembling a power tool, the method comprising:
obtaining a battery pack interface comprising a body at least partially defining a battery pack receiving portion and at least one vibration isolation portion monolithically formed with and extending from the battery pack receiving portion; and
attaching the battery pack interface to a power tool housing such that the at least one vibration isolation portion is arranged for at least partially isolating a battery pack from one or more forces generated by the power tool.

17. The method of claim 16, wherein the at least one vibration isolation portion comprises a material selected from the group consisting of metal, amorphous thermoplastic, and semi-crystalline thermoplastic.

18. The method of claim 16, wherein the at least one vibration isolation portion is connected to each of the battery pack receiving portion and a housing attachment portion, and attaching the battery pack interface to the power tool housing comprises positioning the housing attachment portion in a recess in the power tool housing.

19. A power tool, comprising:

a power tool housing; and a battery pack interface at least partially received in the power tool housing, the battery pack interface comprising a body at least partially defining a battery pack receiving portion for receiving a battery pack and at least one vibration isolation portion extending towards the power tool housing, the at least one vibration isolation portion comprises at least one compliant member, the at least one compliant member comprises a plurality of compliant segments, at least one compliant segment of the plurality of compliant segments comprises a long arm and a curved arm extending from the long arm, the long arm of the at least one compliant segment of the plurality of compliant segments is in a generally spaced and parallel relation with a long arm of a respective adjacent compliant segment, the at least one vibration isolation portion for at least partially isolating a battery pack from one or more forces generated by the power tool.

20. The power tool of claim 19, wherein the at least one vibration isolation portion is connected to each of the battery pack receiving portion and a housing attachment portion of the body, the housing attachment portion comprising a rail at least partially received in a channel in a receptacle of the power tool housing.

* * * * *